(12) United States Patent
Katsuda et al.

(10) Patent No.: US 12,429,668 B2
(45) Date of Patent: Sep. 30, 2025

(54) LENS UNIT AND IMAGE OBSERVING DEVICE

(71) Applicant: Sony Interactive Entertainment Inc., Tokyo (JP)

(72) Inventors: Yasutoshi Katsuda, Kanagawa (JP); Manabu Ishioka, Tokyo (JP); Shotaro Tada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 813 days.

(21) Appl. No.: 17/269,441

(22) PCT Filed: Aug. 28, 2019

(86) PCT No.: PCT/JP2019/033759
§ 371 (c)(1),
(2) Date: Feb. 18, 2021

(87) PCT Pub. No.: WO2020/045517
PCT Pub. Date: Mar. 5, 2020

(65) Prior Publication Data
US 2021/0325634 A1  Oct. 21, 2021

(30) Foreign Application Priority Data

Aug. 28, 2018  (JP) ................................. 2018-159721

(51) Int. Cl.
*G02B 9/12*  (2006.01)
*G02B 3/08*  (2006.01)
(Continued)

(52) U.S. Cl.
CPC ................ *G02B 9/12* (2013.01); *G02B 3/08* (2013.01); *G02B 13/18* (2013.01); *G02B 27/0172* (2013.01)

(58) Field of Classification Search
CPC . G02B 9/12; G02B 3/08; G02B 13/18; G02B 27/0172
See application file for complete search history.

(56) References Cited

U.S. PATENT DOCUMENTS 2,730,925 A * 1/1956 Kavanagh ............ G02B 25/001
359/717
3,028,793 A * 4/1962 Bousky .................. G02B 13/18
359/772
(Continued)

FOREIGN PATENT DOCUMENTS

CN          105045015 A     11/2015
CN          107250896 A     10/2017
(Continued)

OTHER PUBLICATIONS

Cousins "The Optics of Projection Television" The Radio Constructor, Oct. 1953 (Year: 1953).*
(Continued)

*Primary Examiner* — George G. King
(74) *Attorney, Agent, or Firm* — Kilpatrick Townsend & Stockton LLP

(57) ABSTRACT

A lens unit includes a first lens and a second lens. The first lens is a Fresnel lens that has a first lens surface having a Fresnel structure on the second lens side, and has a positive refractive power. The second lens is a Fresnel lens that has a second lens surface having a Fresnel structure on the first lens side, and has a positive refractive power.

7 Claims, 14 Drawing Sheets

(51) Int. Cl.
*G02B 13/18* (2006.01)
*G02B 27/01* (2006.01)

(56) References Cited

U.S. PATENT DOCUMENTS

| | | | | |
|---|---|---|---|---|
| 3,580,655 | A * | 5/1971 | Leith | H04N 5/89 |
| | | | | 355/2 |
| 3,894,787 | A * | 7/1975 | Leith | G03H 1/28 |
| | | | | 359/24 |
| 5,013,133 | A * | 5/1991 | Buralli | G02B 27/4216 |
| | | | | 359/558 |
| 5,790,322 | A | 8/1998 | Kameda | |
| 9,104,019 | B2 | 8/2015 | Okano | |
| 9,323,040 | B2 | 4/2016 | Ishizuka | |
| 9,759,889 | B1 | 9/2017 | Tang | |
| 10,459,215 | B2 | 10/2019 | Iba | |
| 10,502,950 | B2 | 12/2019 | Kikuchi | |
| 10,641,931 | B2 | 5/2020 | Tada | |
| 10,921,583 | B2 | 2/2021 | Matsumoto | |
| 2003/0058546 | A1* | 3/2003 | Sato | G02B 13/0035 |
| | | | | 359/642 |
| 2006/0256452 | A1 | 11/2006 | Lung | |
| 2010/0026920 | A1 | 2/2010 | Kim | |
| 2010/0061105 | A1 | 3/2010 | Shyu | |
| 2013/0176628 | A1* | 7/2013 | Batchko | G02B 3/12 |
| | | | | 359/665 |
| 2013/0209677 | A1 | 8/2013 | Dellea | |
| 2014/0218806 | A1 | 8/2014 | Ishizuka | |
| 2014/0347624 | A1 | 11/2014 | Ando | |
| 2014/0347739 | A1 | 11/2014 | Okano | |
| 2015/0301317 | A1 | 10/2015 | Watanabe | |
| 2016/0316180 | A1 | 10/2016 | Han | |
| 2017/0336539 | A1 | 11/2017 | Perreault | |
| 2018/0074318 | A1 | 3/2018 | Wheelwright | |
| 2018/0074325 | A1 | 3/2018 | Wheelwright | |
| 2018/0143400 | A1 | 5/2018 | Bone | |
| 2018/0275398 | A1 | 9/2018 | Kikuchi | |
| 2018/0307036 | A1 | 10/2018 | Iba | |
| 2018/0372925 | A1 | 12/2018 | Tada | |
| 2019/0049752 | A1 | 2/2019 | Van Heugten | |
| 2019/0072763 | A1 | 3/2019 | Matsumoto | |
| 2021/0011291 | A1 | 1/2021 | Chen | |
| 2021/0199967 | A1 | 7/2021 | Takagi | |
| 2021/0302627 | A1 | 9/2021 | Suzuki | |
| 2023/0125258 | A1 | 4/2023 | Connor | |

FOREIGN PATENT DOCUMENTS

| | | |
|---|---|---|
| DE | 112019003514 T5 | 4/2021 |
| JP | 5346539 A | 12/1993 |
| JP | 2006330432 A | 12/2006 |
| JP | 2007011216 A | 1/2007 |
| JP | 2013045020 A | 3/2013 |
| JP | 2014228716 A | 12/2014 |
| JP | 2015203850 A | 11/2015 |
| JP | 2017211474 A | 11/2017 |
| JP | 2017211475 A | 11/2017 |
| JP | 2018106167 A | 7/2018 |
| JP | 2018138654 A | 9/2018 |
| JP | 2020013106 A | 1/2020 |
| KR | 20050023970 A | 3/2005 |
| WO | 2017138480 A1 | 8/2017 |
| WO | 2017161437 A1 | 9/2017 |
| WO | 2018008249 A1 | 1/2018 |
| WO | 2018117025 A1 | 6/2018 |
| WO | 2019163415 A1 | 8/2019 |
| WO | 2020021916 A1 | 1/2020 |

OTHER PUBLICATIONS

Rinia et al. "The Manufacture of Correction Plates for Schmidt Optical Systems" Philips Technical Review vol. 9, No. 12, pp. 349-356, 1947 (Year: 1947).*
Alphen et al. "Projection-Television Receiver, I The Optical System for the Projection" Philips Technical Review vol. 10, No. 3, pp. 69-78, 1948 (Year: 1948).*
Printout of Eijiro Web Pro English Japanese Translations of effective radius and effective diameter available at https://eow.alc.co.jp/search?q=%e6%9c%89%e5%8a%b9%e5%be%84 & https://eow.alc.co.jp/search?q=%e6%9c%89%e5%8a%b9%e5%8d%8a%e5%be%84 (Year: 2024).*
Vanderwerf "Applied Prismatic and Reflective Optics; Chapter 9, Fresnel Lenses" pp. 237-283, 2010 (Year: 2010).*
International Search Report for corresponding PCT Application No. PCT/JP2019/033759, 4 pages, dated Dec. 3, 2019.
International Search Report for related PCT Application No. PCT/JP2019/033760, 4 pages, dated Dec. 3, 2019.
International Preliminary Report on Patentability and Written Opinion corresponding PCT Application No. PCT/JP2019/033759, 9 pages, dated dated Mar. 11, 2021.
International Preliminary Report on Patentability and Written Opinion for related PCT Application No. PCT/JP2019/033760, 9 pages, dated Mar. 11, 2021.
Office Action for corresponding JP Application No. 2020-539554, 5 pages, dated Nov. 9, 2021.
Office Action for related CN application No. 201980057197.3, 18 pages, dated Sep. 28, 2022.
Extended European Search Report for corresponding EP Application No. 19853868.8, 9 pages, dated Apr. 22, 2022.
Wikipedia, "Image Circle", URL:https://en.wikipedia.org/wiki/Image_circle, 2 pages dated Oct. 27, 2018.
Notice of Reasons for Refusal for corresponding application No. 2020-539555, 8 pages, dated Feb. 20, 2023.
Decision to Grant a Patent for related JP Application No. 2020-539554, 3 pages, dated Jan. 13, 2022.
Office Action for related U.S. Appl. No. 18/534,990 14 pages, dated Aug. 9, 2024.

* cited by examiner (a)

(b)

LENS UNIT AND IMAGE OBSERVING DEVICE

TECHNICAL FIELD

The present invention relates to a lens unit and an image observing device including the lens unit.

BACKGROUND ART

Japanese Patent Laid-Open No. 2014-228716 and Japanese Patent Laid-Open No. 2013-045020 disclose an ocular lens that can be mounted in an image observing device disposed in front of the eyes of a user, the image observing device being a head-mounted display, an electronic viewfinder of a camera, or the like.

SUMMARY

Technical Problem

It is preferable that a lens unit used as the ocular lens in the above-described image observing device have a wide viewing angle, be compact in an optical axis direction, and be lightweight.

Solution to Problem

A lens unit proposed in the present disclosure includes a first lens and a second lens. The first lens and the second lens are arranged in order of the first lens and the second lens from an image display element side to an observation surface side. The first lens has a first lens surface having a Fresnel structure on the second lens side. The first lens is a Fresnel lens having a positive refractive power. The second lens has a second lens surface having a Fresnel structure on the first lens side. The second lens is a Fresnel lens having a positive refractive power. According to this structure, it is possible to realize a lens unit that has a wide viewing angle, is compact in an optical axis direction, and is lightweight. In addition, an image observing device proposed in the present disclosure includes the lens unit.

DESCRIPTION OF EMBODIMENT

Figure 1:
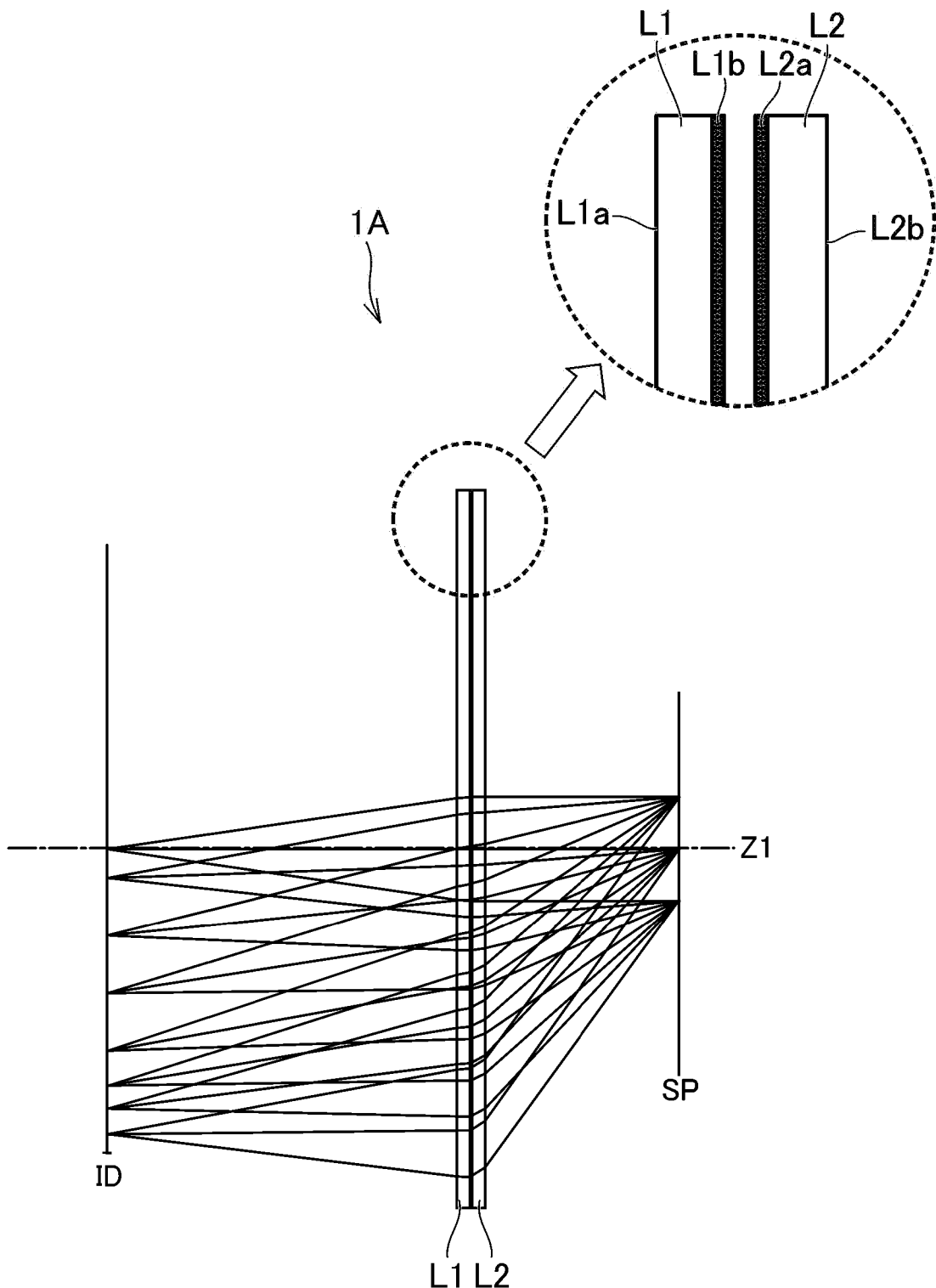
FIG. 1 is a diagram illustrating a first example of a lens configuration of a lens unit proposed in the present disclosure.

Lens units proposed in the present disclosure will hereinafter be described. FIG. 1 is a diagram illustrating a configuration of a lens unit 1A as an example of a lens unit. The lens unit 1A includes a first lens L1 and a second lens L2 that are arranged along an optical axis Z1. The lens unit 1A is formed by only the two lenses L1 and L2.

Figure 7:
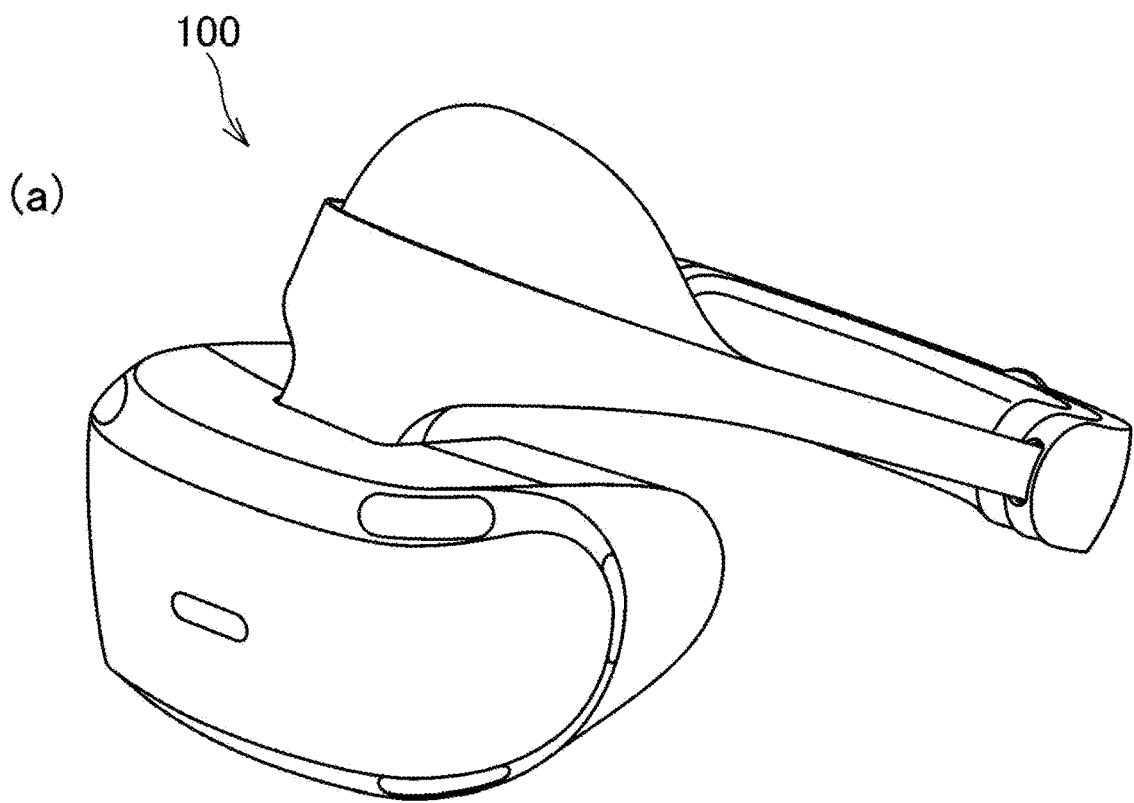
FIG. 7 is a diagram illustrating an example of a head-mounted display including the lens unit proposed in the present disclosure.
Figure 7:
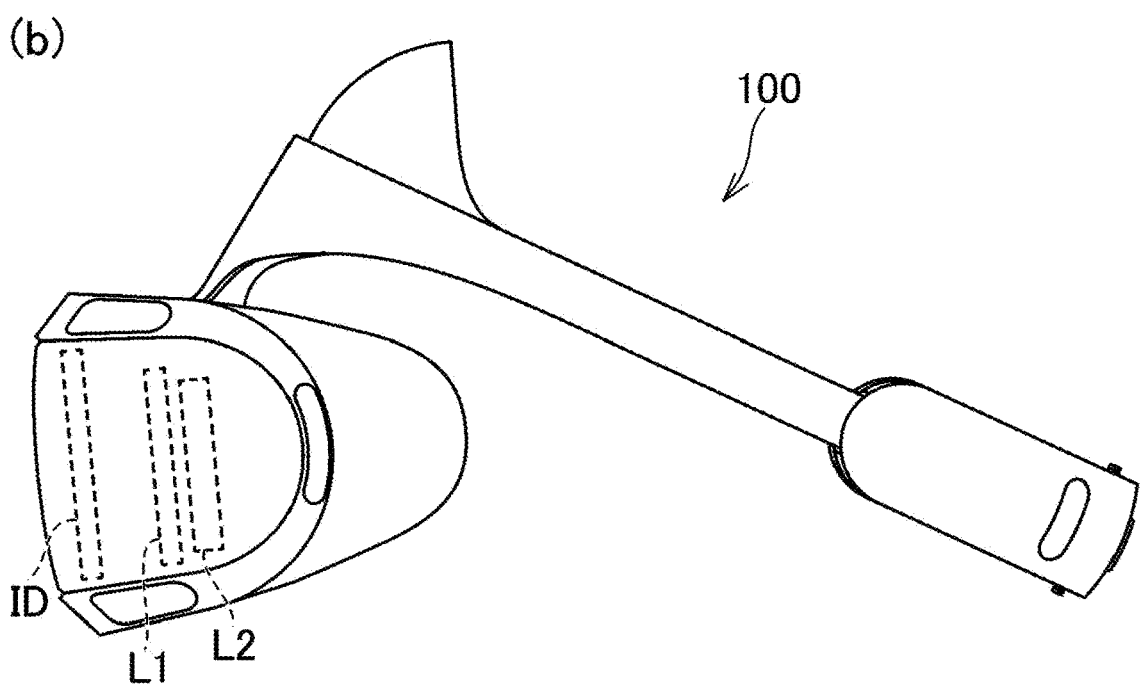

The lens unit 1A is used as an ocular optical system included in an image observing device for a user to view a still image or a moving image displayed on a display element. The image observing device is, for example, a head-mounted display 100 (see FIG. 7). The head-mounted display 100 has a display surface ID disposed in front of the eyes of the user (observer). The display surface ID is, for example, a liquid crystal display device, an organic EL (electroluminescence) display device, a micro-OLED (organic light emitting diode) display device, or the like. The first lens L1 and the second lens L2 are arranged in order of the first lens L1 and the second lens L2 from the display surface ID side to an observation surface SP side. No other lens is disposed between the first lens L1 and the display surface ID. In addition, no other lens is disposed between the second lens L2 and the observation surface SP. In a case where the lens unit 1A is included in the head-mounted display 100, two lens units 1A are arranged side by side in a horizontal direction. Incidentally, the image observing device including the lens unit 1A is not limited to the head-mounted display 100, but may, for example, be an electronic viewfinder of a camera or the like. In this case, the number of lens units 1A included in the image observing device may be one.

First Configuration Example

The first lens L1 has a lens surface L1$a$ facing the display surface ID side and a lens surface L1$b$ facing the second lens L2 (facing the observation surface SP side). The second lens L2 has a lens surface L2$a$ facing the first lens L1 (facing the display surface ID side) and a lens surface L2$b$ facing the observation surface SP side. An eye of an observer is positioned on the observation surface SP.

The first lens L1 is a Fresnel lens having a Fresnel structure in the lens surface L1$b$. The first lens L1 has a positive refractive power due to an action of the lens surface L1$b$. The second lens L2 is a Fresnel lens having a Fresnel structure in the lens surface L2$a$. The second lens L2 has a positive refractive power due to an action of the lens surface L2$a$. The first lens L1 and the second lens L2 are arranged such that the lens surfaces L1$b$ and L2$a$ having a Fresnel structure face each other.

In the example of the lens unit 1A, the lens surface L1$a$ on the display surface ID side of the first lens L1 and the lens surface L2$b$ on the observation surface SP side of the second lens L2 are a substantially flat surface. These two lens surfaces L1$a$ and L2$b$ may be a spherical surface, an aspheric surface, or a free-form surface.

Figure 2:
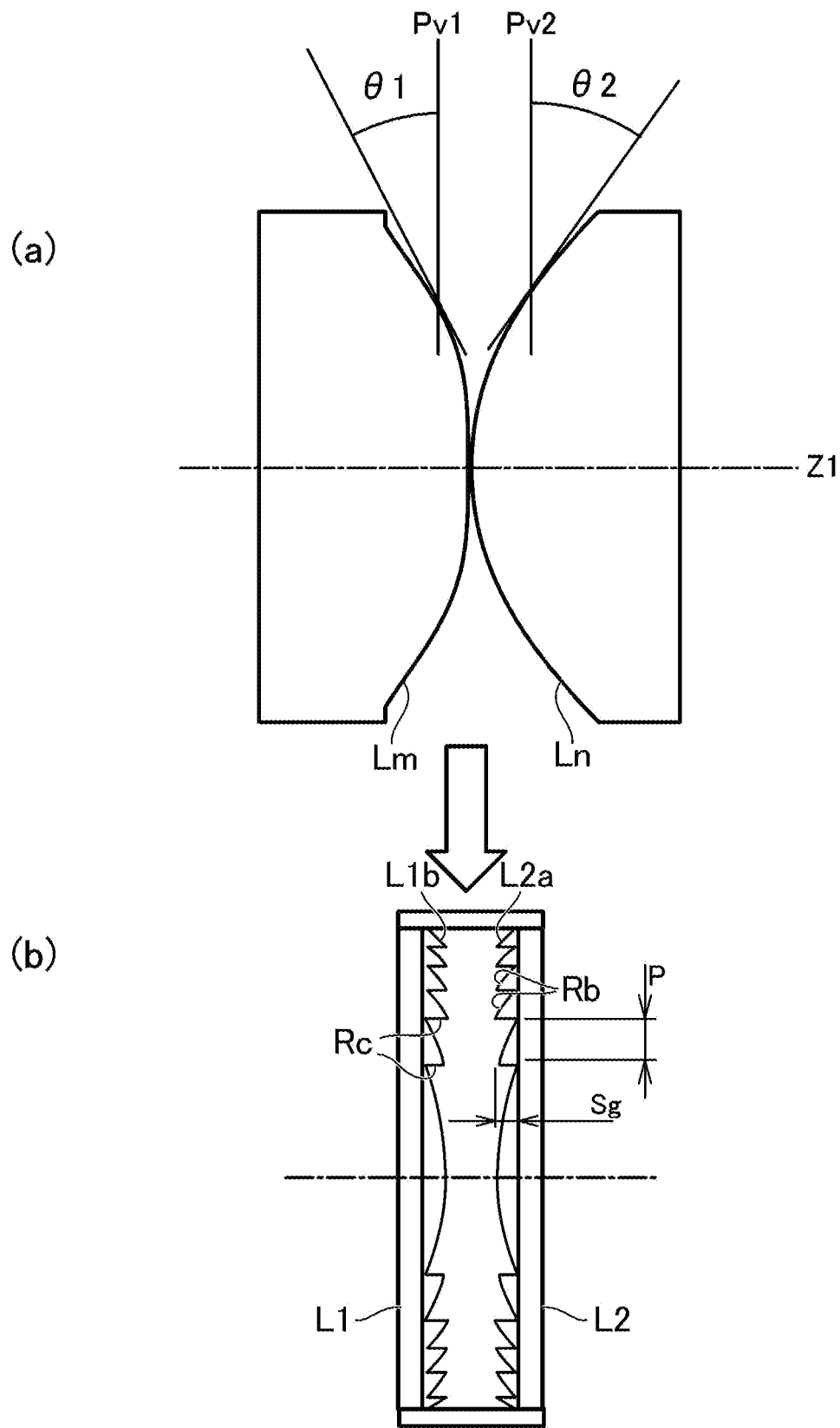
FIG. 2 is a diagram of assistance in explaining tangent planes of convex lenses on which Fresnel lenses are based.

Lens surfaces Lm and Ln illustrated in FIG. 2($a$) are lens surfaces on which the lens surface L1$b$ of the first lens L1 and the lens surface L2$a$ of the second lens L2 are based. The lens surface Lm has a convex shape facing the lens surface Ln, and has a negative radius of curvature (direction from the observation surface SP side to the display surface ID side is set as a positive direction). The lens surface Ln has a convex shape bulging toward the lens surface Lm, and has a positive radius of curvature. (The direction from the observation surface SP side to the display surface ID side is set as a positive direction. Hence, a positive radius of curvature indicates that the lens surface is present on the display surface ID side with respect to the center of a circle of curvature, and a negative radius of curvature indicates that the lens surface is present on the observation surface SP side with respect to the center of the circle of curvature.) The lens surfaces Lm and Ln are a spherical surface, an aspheric surface, or a free-form surface. As illustrated in FIG. 2($b$), the lens surfaces Lm and Ln are divided into a plurality of curved surfaces (orbicular zones) Rb arranged concentrically. The plurality of orbicular zones Rb are arranged on a plane with the optical axis Z1 as a center, and thereby constitute the lens surfaces L1$b$ and L2$a$. A pitch P (see FIG. 2($b$)) of the orbicular zones Rb excluding central portions of the lenses L1$b$ and L2$a$ is, for example, 80 μm or more and 1800 μm or less. An amount of sag Sg (see FIG. 2($b$)) of the orbicular zones Rb is, for example, 25 μm or more and 300 μm or less. The lens surface Lm on which the lens surface L1$b$ of the first lens L1 is based has a condensing action of refracting light to the optical axis Z1 side. The lens surface Ln on which the lens surface L2$a$ of the second lens L2 is based has a condensing action of refracting light to the optical axis Z1 side. Incidentally, in the following description, the radii of curvature of the lens surfaces L1$b$ and L2$a$ having a Fresnel structure refer to the radii of curvature of the lens surfaces Lm and Ln illustrated in FIG. 2($a$), the lens surfaces L1$b$ and L2$a$ being based on the lens surfaces Lm and Ln. This applies also to lens units in other examples illustrated in FIGS. 3 to 6.

Thus, because the two lenses L1 and L2 have a Fresnel structure, a sufficient refractive power is obtained even when the lenses L1 and L2 are thin. As a result, the lens unit 1A and the image observing device that have a wide viewing angle (wide angle of view), are compact in an optical axis direction, and are lightweight are obtained.

In addition, the image observing device such as a head-mounted display can reduce distortion and chromatic aberration of magnification by correcting an image itself displayed on the display surface ID. However, the correction of the image cannot reduce field curvature (and astigmatism). In the case of a large field curvature, the user cannot focus on the image. Hence, it is particularly important to reduce field curvature (and astigmatism) in an optical system used in the image observing device. In the lens unit 1A, the lens surfaces L1$b$ and L2$a$ to which a Fresnel structure is applied face each other. Therefore, unlike a case where two lens surfaces having a Fresnel structure face in a same direction, for example, the structure of the lens unit 1A can be brought close to symmetry with respect to the center of the lens unit 1A in the optical axis direction (for example, a plane orthogonal to an optical axis and located between the two lenses L1 and L2). As a result, it is easy to cancel aberration caused by the lens surface L1$b$ and aberration caused by the lens surface L2$a$, and thus cancel total aberration, and it is possible to reduce field curvature (and astigmatism).

In addition, because the lens surfaces L1$b$ and L2$a$ having a Fresnel structure face each other, adhesion of dirt and dust to these two lens surfaces L1$b$ and L2$a$ can be prevented. As illustrated in FIG. 2($b$), a space between the lens surfaces L1$b$ and L2$a$ may be sealed by a sealing material attached to edges of the two lenses L1 and L2. This can prevent dirt and dust from adhering to the lens surfaces L1$b$ and L2$a$ more effectively.

Incidentally, the lens surfaces L1$b$ and L2$a$ have a surface Rc rising in the direction of the optical axis Z1 and connected to a curved surface Rb (see FIG. 2($b$); the surface Rc is a perpendicular surface of a plurality of prisms arranged concentrically, and will hereinafter be referred to as a "rising surface"). The rising surface Rc may be inclined with respect to the direction of the optical axis Z1. Inclination angles of a plurality of rising surfaces Rc may be different from each other according to positions of the rising surfaces Rc (distances from the optical axis Z1).

The presence of the rising surface Rc between two orbicular zones Rb adjacent to each other causes variations in intensity of passing light according to the distance from the optical axis Z1. That is, a luminance of the passing light periodically changes according to the distance from the optical axis Z1. This may cause annular lines (referred to as ring lines) to appear on a displayed image. In order to suppress the appearance of such ring lines, the pitch P (see FIG. 2($b$)) of the orbicular zones Rb may change according to the positions of the orbicular zones Rb (distance from the optical axis Z1). That is, conspicuousness of the ring lines may be suppressed by reducing the pitch P at positions where the ring lines tend to be conspicuous.

In addition, pitches P in the two lens surfaces L1$b$ and L2$a$ may be different from each other. That is, the positions of the rising surfaces Rc (distances from the optical axis Z1) may differ from each other between the two lens surfaces L1$b$ and L2$a$. This can reduce variations in intensity of the passing light, and can thus suppress the conspicuousness of the ring lines.

When the amount of sag Sg (see FIG. 2($b$)) of the orbicular zones Rb is increased, a width of the orbicular zones Rb in a radial direction is increased, and thus a degradation in lens resolution can be suppressed. Accordingly, both the amount of sag Sg of the orbicular zones Rb and the pitch P of the orbicular zones Rb may be changed according to the distance from the optical axis Z1. This can achieve both prevention of the occurrence of the ring lines (reduction of variations in intensity of the passing light) and prevention of the degradation in resolution. That is, a largest pitch P in a range in which the ring lines do not occur may be determined according to the distance from the optical axis Z1. For example, near the optical axis Z1, the pitch P may be increased (the amount of sag Sg may be increased) to secure a sufficient resolution, and as the distance from the optical axis Z1 is increased, the pitch P may be reduced (the amount of sag Sg may be reduced) to suppress the occurrence of the ring lines.

In FIG. 2(a), an angle formed between a plane Pv1 orthogonal to the optical axis Z1 and a tangent plane of the lens surface L1b of the first lens L1, that is, an angle θ1 formed between the plane Pv1 orthogonal to the optical axis Z1 and a tangent plane of the lens surface Lm on which the lens surface L1b is based is set as a tangent angle of the lens surface L1b. Here, the tangent angle θ1 is an acute angle formed between the tangent plane of the lens surface L1b and the plane Pv1 orthogonal to the optical axis Z1. In addition, an angle formed between a plane Pv2 orthogonal to the optical axis Z1 and a tangent plane of the lens surface L2a of the second lens L2, that is, an angle θ2 formed between the plane Pv2 orthogonal to the optical axis Z1 and a tangent plane of the lens surface Ln on which the lens surface L2a is based is set as a tangent angle of the lens surface L2a. Here, the tangent angle θ2 is an acute angle formed between the tangent plane of the lens surface L2a and the plane Pv2 orthogonal to the optical axis Z1. When the tangent angles are thus defined, a maximum of an absolute value of the tangent angle θ1 within a range of an effective diameter of the lens surface L1b is preferably 30 degrees or more and 55 degrees or less. In addition, a maximum of an absolute value of the tangent angle θ2 within a range of an effective diameter of the lens surface L2a is preferably 30 degrees or more and 55 degrees or less. When the maxima of the absolute values of the tangent angles θ1 and θ2 become smaller than 30 degrees, a sufficient refractive power cannot be obtained, and thus a desirable wide viewing angle cannot be achieved. In addition, when the maxima of the absolute values of the tangent angles θ1 and θ2 become larger than 55 degrees, the width of each of the plurality of curved surfaces Rb arranged concentrically (plurality of prisms arranged concentrically), the plurality of curved surfaces Rb constituting the lens surfaces L1b and L2a, is reduced, and thus a loss in amount of light becomes excessive.

In the lens unit 1A, letting F be a composite focal length of the first lens L1 and the second lens L2, and letting Φ be the diameter of an image circle of the lens unit 1A, the following condition is preferably satisfied.

Condition: $0.6 \times \Phi - 4.0 \leq F \leq 0.6 \times \Phi + 8.0$

When the composite focal length F becomes smaller than this range, it becomes difficult for the user to focus even in the image circle. When the composite focal length F conversely becomes larger than this range, a sufficient refractive power cannot be obtained, and thus it becomes difficult to achieve a desirable wide viewing angle.

Second Configuration Example

Figure 3:
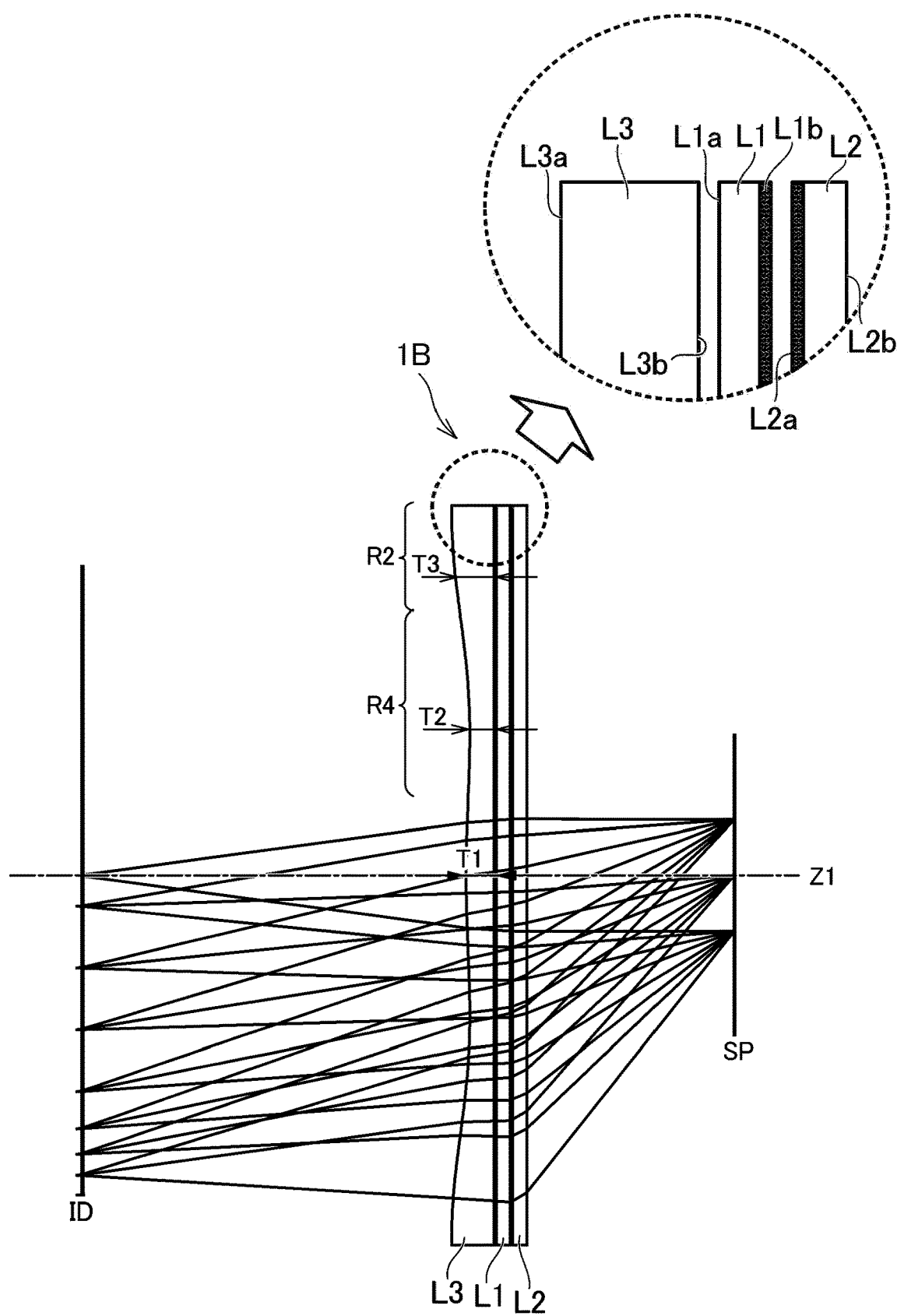
FIG. 3 is a diagram illustrating a second example of the lens configuration of the lens unit proposed in the present disclosure.

FIG. 3 is a diagram illustrating a configuration of a lens unit 1B as another example of the lens unit.

The lens unit 1B includes a first lens L1 and a second lens L2. As with the first lens L1 of the lens unit 1A, the first lens L1 is a Fresnel lens having a Fresnel structure in a lens surface L1b on the second lens L2 side. The first lens L1 has a positive refractive power due to an action of the lens surface L1b. As with the second lens L2 of the lens unit 1A, the second lens L2 is a Fresnel lens having a Fresnel structure in a lens surface L2a on the first lens L1 side. The second lens L2 has a positive refractive power due to an action of the lens surface L2a. The first lens L1 and the second lens L2 are arranged such that the lens surfaces L1b and L2a having a Fresnel structure face each other.

As in the lens unit 1A, also in the lens unit 1B, a maximum of an absolute value of a tangent angle θ1 (see FIG. 2) within a range of an effective diameter of the lens surface L1b is preferably 30 degrees or more and 55 degrees or less. In addition, a maximum of an absolute value of a tangent angle θ2 (see FIG. 2) within a range of an effective diameter of the lens surface L2a is preferably 30 degrees or more and 55 degrees or less.

Unlike the lens unit 1A, the lens unit 1B has a third lens surface L3a on a display surface ID side of a lens surface L1a of the first lens L1. The lens unit 1B has a third lens L3 disposed on the display surface ID side with respect to the first lens L1. The third lens surface L3a is formed on the third lens L3. The lens unit 1B is formed by the three lenses L3, L1, and L2. The lens surface L1a of the first lens L1, a lens surface L2b of the second lens L2, and a lens surface L3b of the third lens L3 are a substantially flat surface.

A peripheral region R2 (see FIG. 3) separated from an optical axis Z1 in the third lens surface L3a is a surface that refracts light in a direction of going away from the optical axis Z1. That is, the third lens L3 has a negative refractive power in the peripheral region R2 (see FIG. 3) separated from the optical axis Z1. This structure facilitates widening a viewing angle (angle of view). In addition, because the third lens L3 is a lens separate from the first lens L1, the first lens L1 is formed easily as compared with a lens unit 1C (see FIG. 4) to be described later in which the third lens surface L3a having a refractive power is formed on the display surface ID side of the first lens L1, for example. Here, the peripheral region R2 is preferably a region from "Effective Diameter of Third Lens Surface L3a×½" to "Effective Diameter of Third Lens Surface L3a." It is not preferable to make a region nearer the optical axis Z1 than Effective Diameter of Third Lens Surface L3a×½ a surface that refracts light in the direction of going away from the optical axis Z1 because resolution at a screen center is degraded.

An index of refraction of the third lens L3 is preferably higher than each of an index of refraction of the first lens L1 and an index of refraction of the second lens L2. Then, the viewing angle can be increased effectively by the third lens L3.

Let n1, n2, and n3 be the index of refraction of the first lens L1, the index of refraction of the second lens L2, and the index of refraction of the third lens L3, respectively. Then, the lens unit 1B preferably satisfies Conditions:

$n1 \leq 1.54$, $n2 \leq 1.54$, and $n3 \geq 1.6$

Then, the viewing angle can be increased effectively by the third lens L3. Incidentally, in the description of the present specification, a d-line (587.6 nm) is set as a reference for each index of refraction.

In addition, let ν1, ν2, and ν3 be an Abbe number of the first lens L1, an Abbe number of the second lens L2, and an Abbe number of the third lens L3, respectively. Then, the lens unit 1B preferably satisfies
Conditions:

$\nu 1 \geq 55$, $\nu 2 \geq 55$, and $\nu 3 \geq 28$

This makes it possible to correct chromatic aberration excellently. Incidentally, in the description of the present specification, the d-line (587.6 nm) is set as a reference for each Abbe number.

The third lens surface L3a as the lens surface on the display surface ID side of the third lens L3 is preferably an aspheric surface. This enables even better aberration correction. In FIG. 3, the third lens L3 includes a center intersecting the optical axis Z1, the outside region R2, and an intermediate region R4 as a region between the center and the outside region R2. Let T1 be a thickness in the center, let T2 be a (minimum) thickness in the intermediate region R4, and let T3 be a (maximum) thickness in the peripheral region R2. Then, the third lens L3 preferably satisfies $T3 > T1 > T2$      Condition:

According to the lens unit 1B, field curvature (astigmatism) can be corrected appropriately.

Specifically, the thicknesses T1, T2, and T3 preferably satisfy
Conditions:

$0.5$ mm $\leq T1 \leq 4.0$ mm, $0.5$ mm $\leq T2 \leq 4.0$ mm, and $2.4$ mm $\leq T3 \leq 6.5$ mm According to the lens unit 1B, field curvature (and astigmatism) can be corrected appropriately. Incidentally, the thicknesses of the first lens L1 and the second lens L2 are preferably 2 mm or less.

In the lens unit 1B, letting F be a composite focal length of the third lens L3, the first lens L1, and the second lens L2, and letting Φ be an image circle of the lens unit 1B, the following condition is preferably satisfied.

$0.6 \times \Phi - 4.0 \leq F \leq 0.6 \times \Phi + 8.0$      Condition:

When the composite focal length F becomes smaller than this range, an amount of change in field curvature becomes large even in the image circle, and thus it becomes difficult for the user to focus. When the composite focal length F conversely becomes larger than this range, a sufficient refractive power cannot be obtained, and thus it becomes difficult to achieve a desirable wide viewing angle.

The composite focal length F and the image circle Φ more preferably satisfy the following condition.

$0.6 \times \Phi \leq F \leq 0.6 \times \Phi + 6.0$      Condition:

When the composite focal length F is in this range, and when the composite focal length F is in this range, it is easy for the user to focus, and it is easy to achieve a desirable wide viewing angle.

In addition, when the image circle Φ satisfies "40 mm ≤ Φ ≤ 50 mm," the composite focal length F preferably satisfies $25$ mm $\leq F \leq 35$ mm      Condition:

When the composite focal length F becomes smaller than this range, it becomes difficult for the user to focus even in the image circle. When the composite focal length F conversely becomes larger than this range, a sufficient refractive power cannot be obtained, and thus it becomes difficult to achieve a desirable wide viewing angle.

In addition, when the image circle Φ satisfies "40 mm ≤ Φ ≤ 50 mm," a composite focal length Fa of the first lens L1 and the second lens L2 preferably satisfies $28$ mm $\leq Fa \leq 38$ mm      Condition:

When the composite focal length Fa becomes smaller than this range, it becomes difficult for the user to focus even in the image circle. When the composite focal length Fa conversely becomes larger than this range, a sufficient refractive power cannot be obtained, and thus it becomes difficult to achieve a desirable wide viewing angle.

Third Configuration Example

Figure 4:
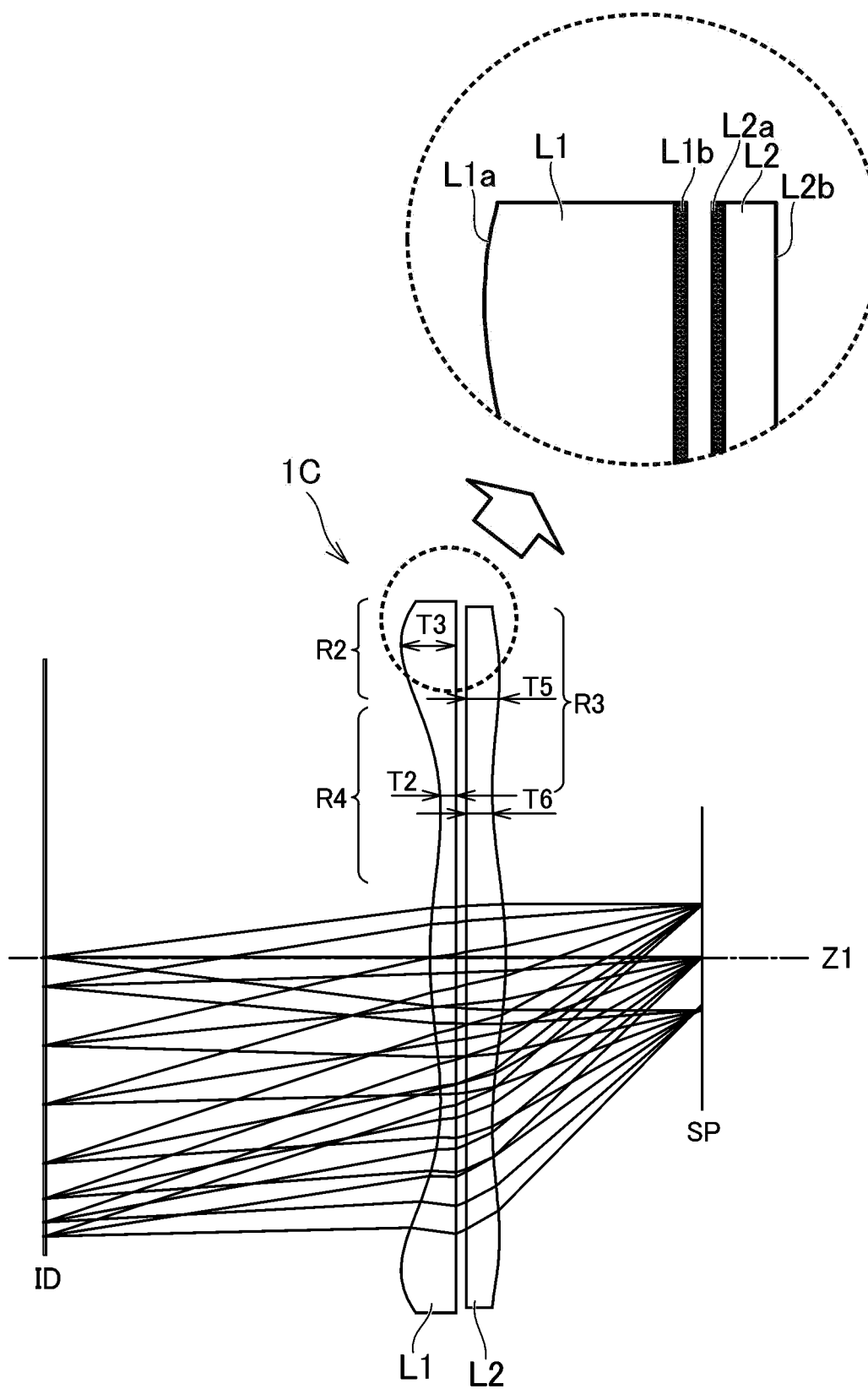
FIG. 4 is a diagram illustrating a third example of the lens configuration of the lens unit proposed in the present disclosure.

FIG. 4 is a diagram illustrating a configuration of a lens unit 1C as another example of the lens unit.

The lens unit 1C includes a first lens L1 and a second lens L2. As with the first lens L1 of the lens unit 1A, the first lens L1 is a Fresnel lens having a Fresnel structure in a lens surface L1b on the second lens L2 side. The first lens L1 has a positive refractive power due to an action of the lens surface L1b. As with the second lens L2 of the lens unit 1A, the second lens L2 is a Fresnel lens having a Fresnel structure in a lens surface L2a on the first lens L1 side. The second lens L2 has a positive refractive power due to an action of the lens surface L2a. The first lens L1 and the second lens L2 are arranged such that the lens surfaces L1b and L2a having a Fresnel structure face each other. The lens unit 1C is formed by only the two lenses L1 and L2.

As in the lens unit 1A, also in the lens unit 1C, a maximum of an absolute value of a tangent angle θ1 (see FIG. 2) within a range of an effective diameter of the lens surface L1b is preferably 30 degrees or more and 55 degrees or less. In addition, a maximum of an absolute value of a tangent angle θ2 (see FIG. 2) within a range of an effective diameter of the lens surface L2a is preferably 30 degrees or more and 55 degrees or less.

The lens unit 1C has a lens surface (third lens surface described in claims) including a surface that refracts light in a direction of going away from an optical axis Z1, the lens surface being on a display surface ID side of a lens surface L1a of the first lens L1. In the example of the lens unit 1C, the first lens L1 has the lens surface L1a on the display surface ID side, and the lens surface L1a includes the surface that refracts light in the direction of going away from the optical axis Z1 in a peripheral region R2 separated from the optical axis Z1. According to this structure, light incident on the peripheral region R2 is refracted so as to go away from the optical axis Z1, so that the viewing angle (angle of view) can be further widened. In addition, unlike the lens unit 1B, the lens surface that refracts light in the direction of going away from the optical axis Z1 is formed in the first lens L1, and therefore a wide viewing angle can be achieved with a small number of lenses.

An index of refraction of the first lens L1 is preferably larger than an index of refraction of the second lens L2. Then, the viewing angle can be increased effectively by the first lens L1.

Let n1 and n2 be the index of refraction of the first lens L1 and the index of refraction of the second lens L2, respectively. Then, the index of refraction n2 of the second lens L2 is preferably 1.54 or less. In addition, the index of refraction n1 of the first lens L1 is preferably 1.6 or more. Then, the viewing angle can be increased effectively by the first lens L1.

In addition, let ν1 and ν2 be an Abbe number of the first lens L1 and an Abbe number of the second lens L2, respectively. Then, the lens unit 1C preferably satisfies $$\nu1 \leq 28, \nu2 \leq 55$$ Conditions:

This makes it possible to correct chromatic aberration appropriately.

In addition, the lens surface L1$a$ on the display surface ID side of the first lens L1 is preferably an aspheric surface. This enables even better aberration correction.

In FIG. 4, the first lens L1 includes a center intersecting the optical axis Z1, the outside region R2, and an intermediate region R4 as a region between the center and the outside region R2. Let T1 be a thickness in the center, let T2 be a (minimum) thickness in the intermediate region R4, and let T3 be a (maximum) thickness in the peripheral region R2. Then, the first lens L1 preferably satisfies $$T3 > T1 > T2$$ Condition:

According to the lens unit 1C, field curvature (astigmatism) can be corrected appropriately.

Specifically, the thicknesses T1, T2, and T3 preferably satisfy
Conditions:

$$0.5 \text{ mm} \leq T1 \leq 4.0 \text{ mm},$$

$$0.5 \text{ mm} \leq T2 \leq 4.0 \text{ mm},$$

$$2.4 \text{ mm} \leq T3 \leq 6.5 \text{ mm}$$

According to the lens unit 1C, field curvature (and astigmatism) can be corrected appropriately.

The second lens L2 has a lens surface L2$b$ facing an observation surface SP side. In the lens unit 1C, the lens surface L2$b$ is an aspheric surface. This can further improve optical performance of the lens unit.

Specifically, the lens surface L2$b$ of the second lens L2 has a convex shape facing the observation surface SP in a range nearer the optical axis Z1 than a peripheral region R3. That is, the lens surface L2$b$ is a convex surface having a negative radius of curvature in the range nearer the optical axis Z1 than the peripheral region R3. Hence, light going out of the lens surface L2$b$ is refracted toward the optical axis Z1. That is, the lens surface L2$b$ has a positive refractive power. According to this structure, it is possible to increase the refractive power of the second lens L2, and thus further increase the viewing angle. The lens surface L2$b$ may be a spherical surface. A thickness T5 of the peripheral region R3 of the lens surface L2$b$ may be larger than a thickness T6 in a region on an inside of the peripheral region R3 of the lens surface L2$b$. Unlike the example of FIG. 4, the whole of the lens surface L2$b$ may be formed in a convex shape.

A central thickness of the second lens L2 is preferably 1.5 mm or more and 4.0 mm or less. When the central thickness of the second lens L2 becomes smaller than this range, stiffness of the second lens L2 is decreased, and the second lens L2 itself warps, so that image forming performance of the lens unit is degraded, and resolving power is decreased. When the central thickness of the second lens L2 becomes larger than this range, an overall length of the lens unit becomes large, and thus miniaturization becomes difficult.

In the lens unit 1C, letting F be a composite focal length of the first lens L1 and the second lens L2, and letting Φ be an image circle of the lens unit 1B, the following condition is preferably satisfied.

$$0.6 \times \Phi - 4.0 \leq F \leq 0.6 \times \Phi + 8.0$$ Condition:

When the composite focal length F becomes smaller than this range, an amount of change in field curvature (and astigmatism) within the image circle becomes large, and thus it becomes difficult for the user to focus. When the composite focal length F conversely becomes larger than this range, a sufficient refractive power cannot be obtained, and thus it becomes difficult to achieve a desirable wide viewing angle.

The composite focal length F and the image circle Φ more preferably satisfy the following condition.

$$0.6 \times \Phi \leq F \leq 0.6 \times \Phi + 6.0$$ Condition:

When the composite focal length F is in this range, and when the composite focal length F is in this range, it is easy for the user to focus, and it is easy to achieve a desirable wide viewing angle, in a case where the lens unit is mounted in the image observing device.

In addition, when the image circle Φ satisfies "40 mm ≤ Φ ≤ 50 mm," the composite focal length F preferably satisfies $$25 \text{ mm} \leq F \leq 35 \text{ mm}$$ Condition:

When the image circle Φ satisfies "60 mm ≤ Φ ≤ 70 mm," the composite focal length F preferably satisfies $$37 \text{ mm} \leq F \leq 47 \text{ mm}$$ Condition:

When the composite focal length F becomes smaller than this range, an amount of change in field curvature (and astigmatism) even in the image circle becomes large, and thus it becomes difficult for the user to focus. When the composite focal length F conversely becomes larger than this range, a sufficient refractive power cannot be obtained, and thus it becomes difficult to achieve a desirable wide viewing angle.

Fourth Configuration Example

Figure 5:
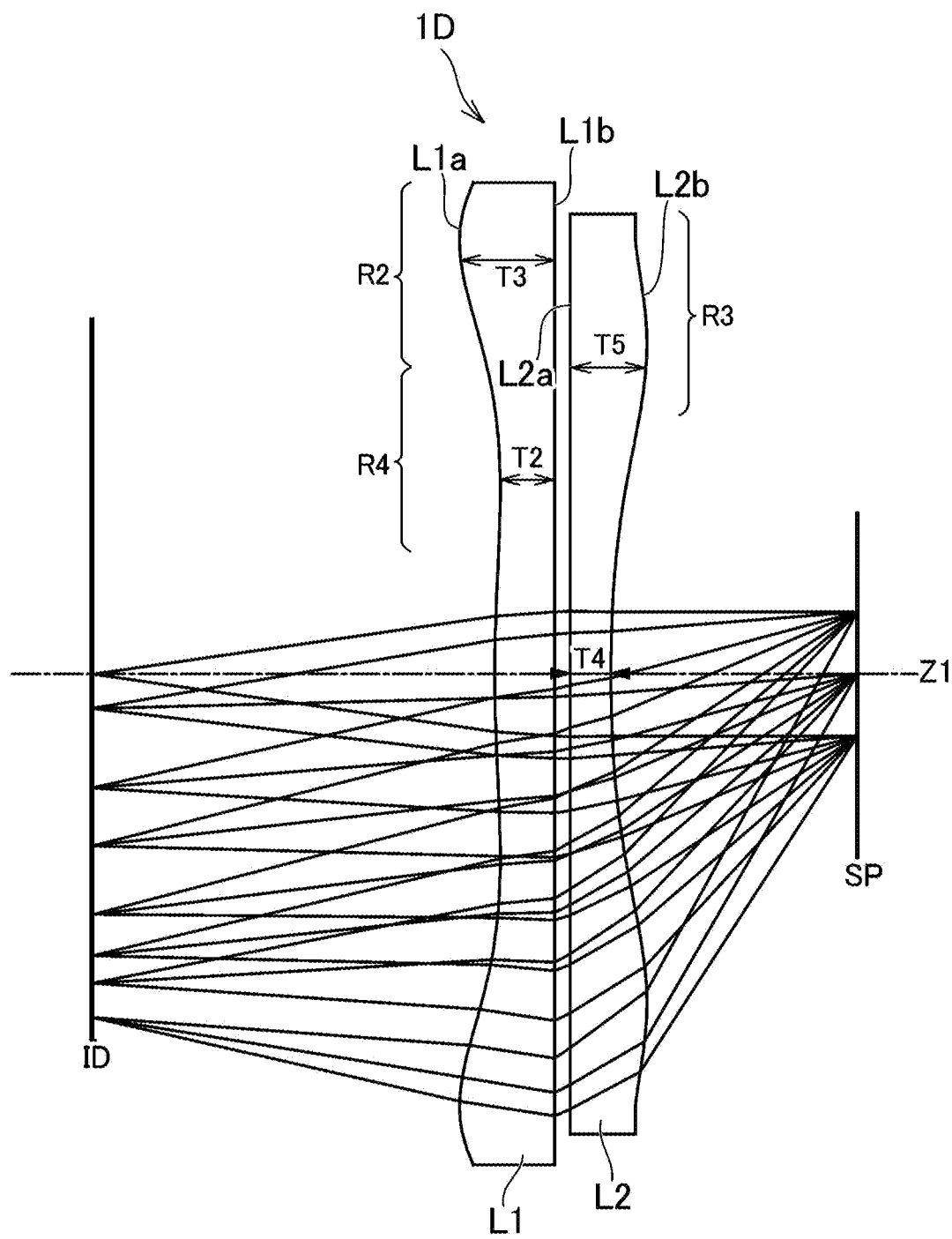
FIG. 5 is a diagram illustrating a fourth example of the lens configuration of the lens unit proposed in the present disclosure.

FIG. 5 is a diagram illustrating a lens unit 1D as a modification of the lens unit 1C formed by the two lenses L1 and L2. In the lens unit 1D, the lens surface L2$b$ of the second lens L2 is an aspheric surface. A thickness T5 of a peripheral portion of the second lens L2 is larger than a central thickness T4 of the second lens L2. In other words, the peripheral region R3 of the lens surface L2$b$ bulges to the observation surface SP side. The central thickness T4 of the second lens L2 is preferably 0.5 mm or more and 3.0 mm or less. When the central thickness T4 becomes smaller than this range, stiffness of the second lens L2 is decreased, and the second lens L2 itself warps, so that the image forming performance of the lens unit is degraded, and resolving power is decreased. When the central thickness T4 of the second lens L2 becomes larger than this range, the thickness of the peripheral portion T5 becomes too large, an overall length of the lens unit becomes large, and thus miniaturization becomes difficult.

When the second lens L2 is too thin, total reflection of light tends to occur within the second lens L2. When light is totally reflected within the peripheral region R3 of the second lens L2, the light is emitted from a central portion of the second lens L2 to the observation surface SP side. This may cause a central portion of a displayed image to become whitish. According to the structure of the lens unit 1D, a lens thickness is secured in the peripheral region R3 of the second lens L2, and therefore the light totally reflected within the peripheral region R3 of the second lens L2 can be reduced. As a result, the central portion of the displayed image can be prevented from becoming whitish. The configuration of the first lens L1 and the other configuration of the second lens L2 may be the same as those of the lens unit 1C.

Incidentally, the lens surfaces L2b (aspheric surfaces) on the observation surface SP side of the second lenses L2 illustrated in FIG. 4 and FIG. 5 may be applied to the second lenses L2 of the lens units 1A and 1B illustrated in FIG. 1 and FIG. 3.

Fifth Configuration Example

Figure 6:
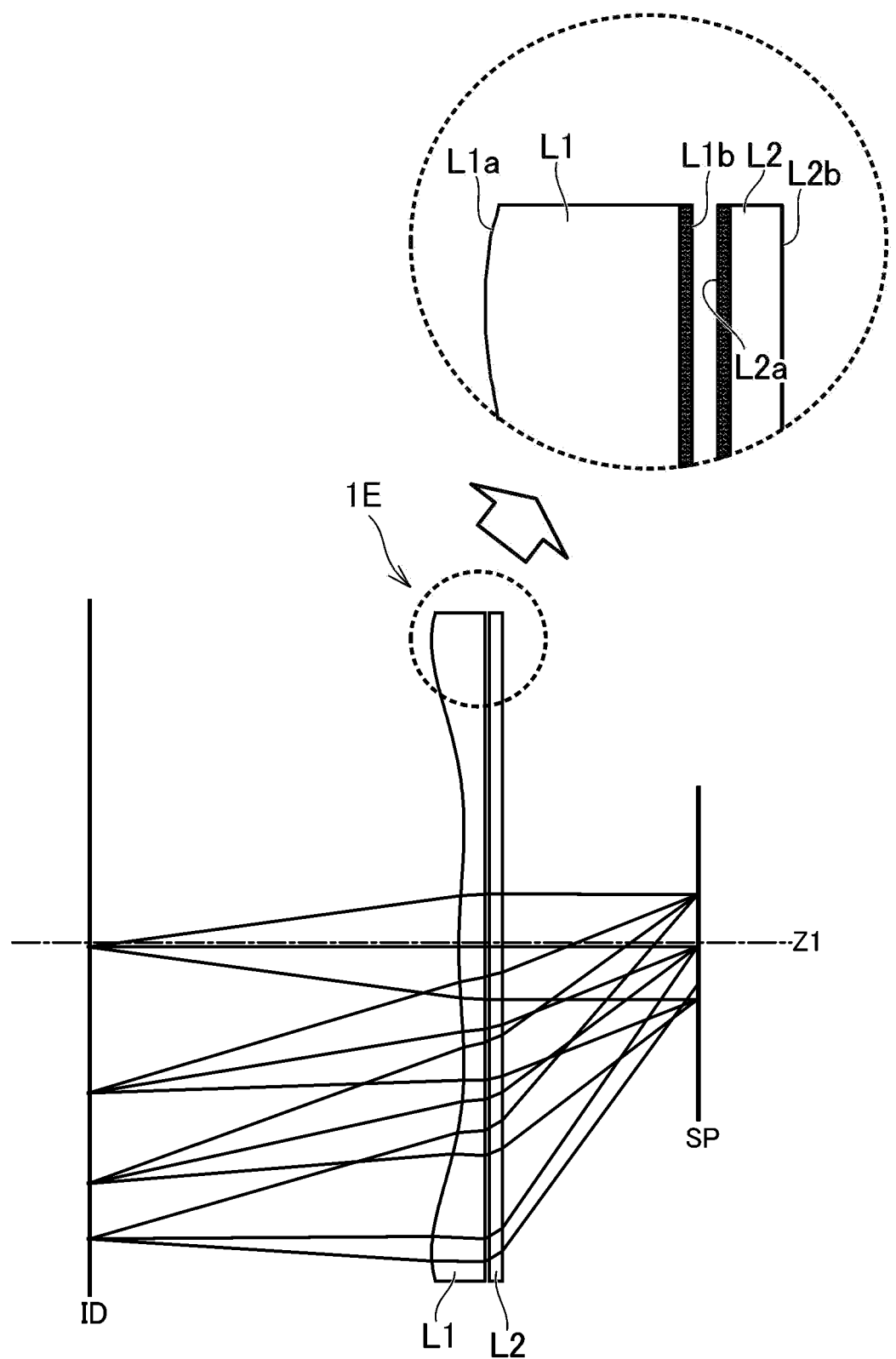
FIG. 6 is a diagram illustrating a fifth example of the lens configuration of the lens unit proposed in the present disclosure.

FIG. 6 is a diagram illustrating a lens unit 1E as yet another modification of the lens unit 1C formed by the two lenses L1 and L2. In the lens unit 1E, the lens surface L2b of the second lens L2 is a substantially flat surface. The other structure of the lens unit 1E is similar to that of the lens unit 1B. In the lens unit 1E, the thickness of the second lens L2 is preferably 0.5 mm or more and 3.0 mm or less.

As described above, according to the lens units 1A to 1E proposed in the present disclosure, it is possible to realize a lens unit that has a wide viewing angle, is compact in the optical axis direction, and is lightweight.

EXAMPLES

First to sixth numerical value examples of the lens units proposed in the present disclosure will be described.

Figure 8:
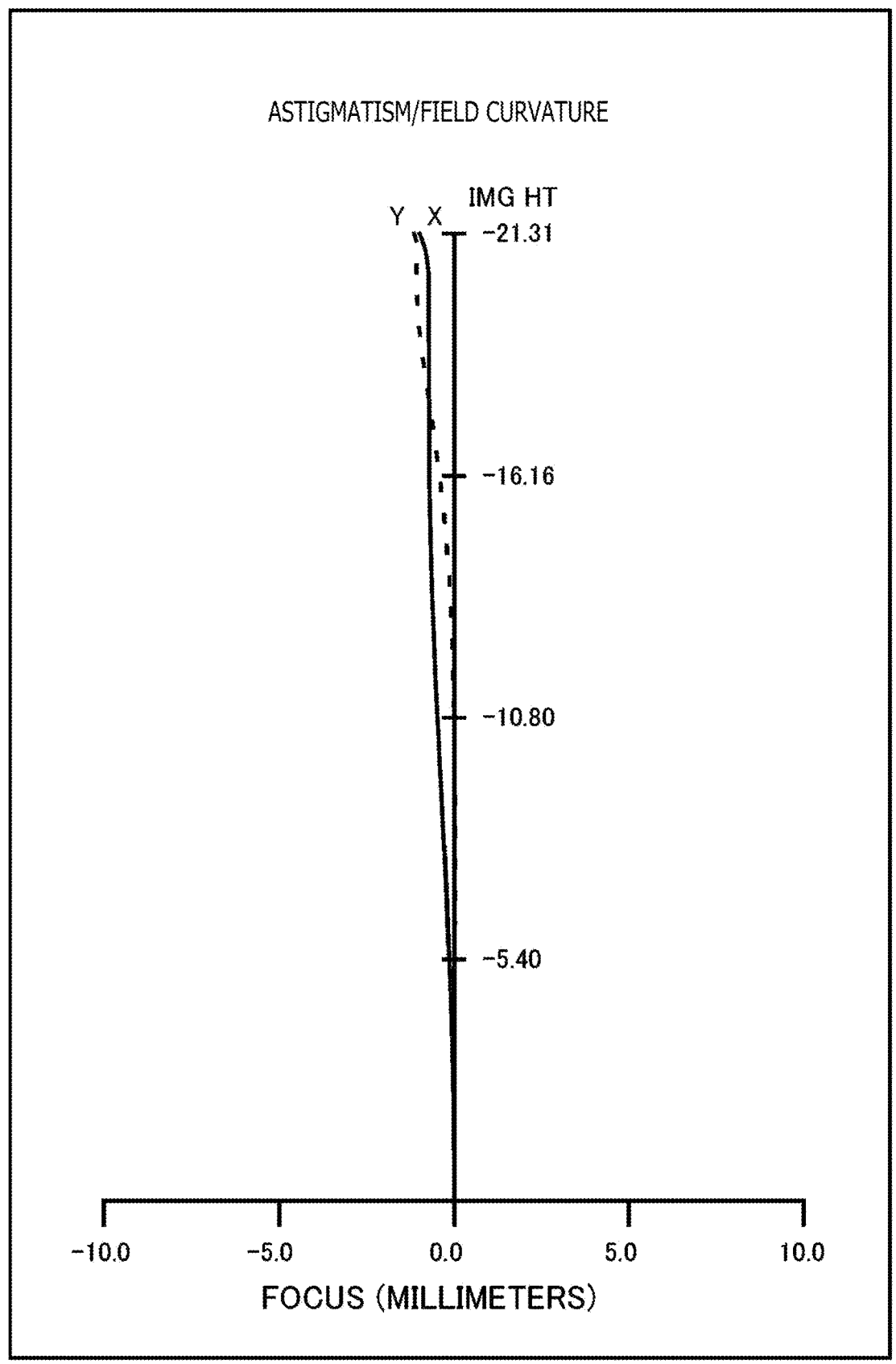
FIG. 8 is an aberration diagram illustrating field curvature and astigmatism of a lens unit having a lens configuration according to the first example illustrated in FIG. 1 and having lens data according to a first numerical value example.

[Table 1-1] to [Table 1-3] indicate lens data (first numerical value example) of the lens unit 1A illustrated in FIG. 1. FIG. 8 is an aberration diagram illustrating field curvature and astigmatism of the lens unit according to the first numerical value example.

Figure 9A:
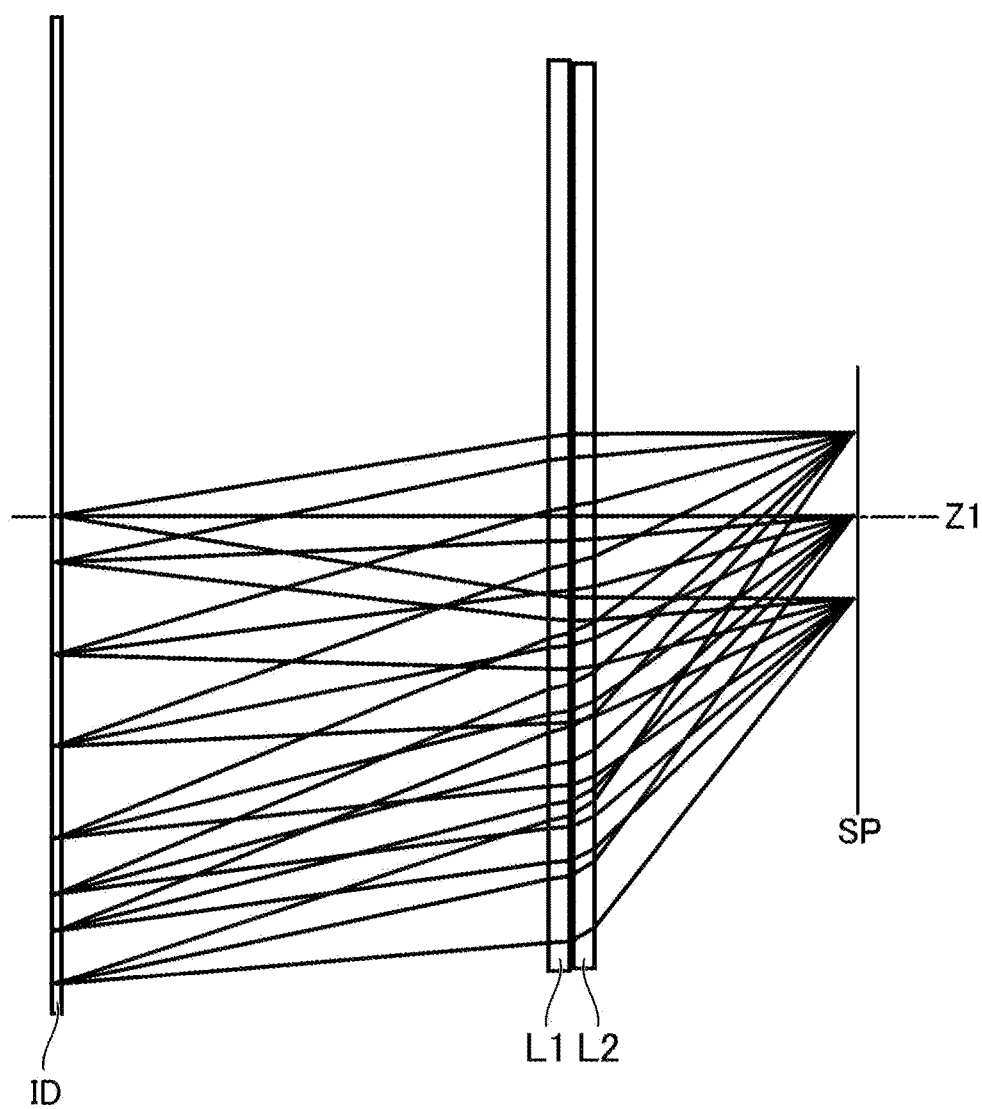
FIG. 9A is a ray diagram of another example of a lens unit having a lens configuration similar to that of the first example illustrated in FIG. 1 (that is, the lens unit has a first lens and a second lens, two lens surfaces of these lenses which lens surfaces face each other have a Fresnel structure, and a lens surface on a display surface side of the first lens and a lens surface on an observation surface side of the second lens L2 are a substantially flat surface).
Figure 9B:
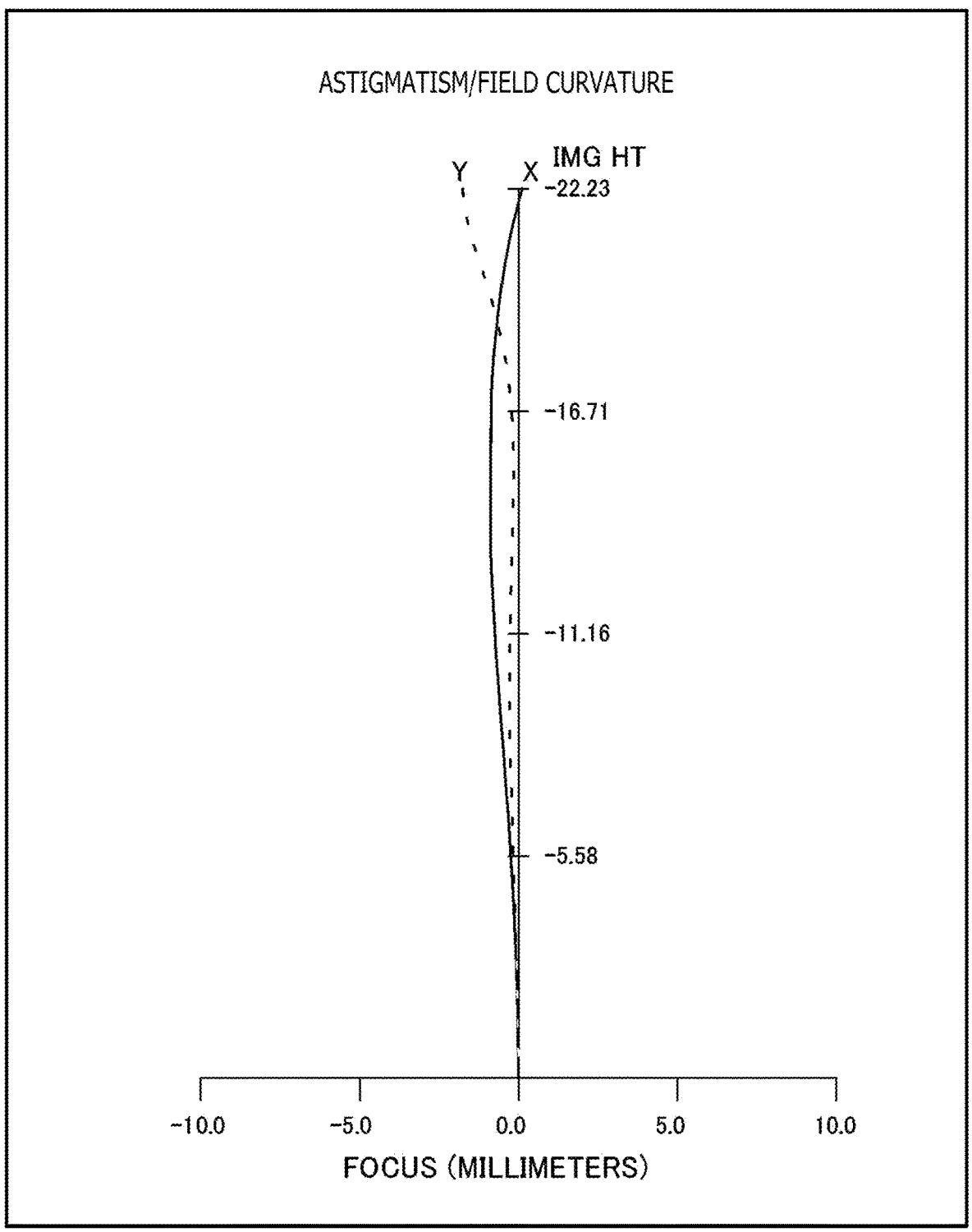
FIG. 9B is an aberration diagram illustrating field curvature and astigmatism of a lens unit having the lens configuration illustrated in FIG. 9A and having lens data according to a second numerical value example.

[Table 2-1] to [Table 2-3] indicate lens data (second numerical value example) of another lens unit having a configuration similar to that of the lens unit 1A illustrated in FIG. 1 (that is, the lens unit has a first lens and a second lens, two lens surfaces of these lenses which lens surfaces face each other have a Fresnel structure, and a lens surface on a display surface side of the first lens and a lens surface on an observation surface side of the second lens L2 are a substantially flat surface). FIG. 9A is a ray diagram of the lens unit according to the second numerical value example. FIG. 9B is an aberration diagram illustrating field curvature and astigmatism of the lens unit according to the second numerical value example.

Figure 10:
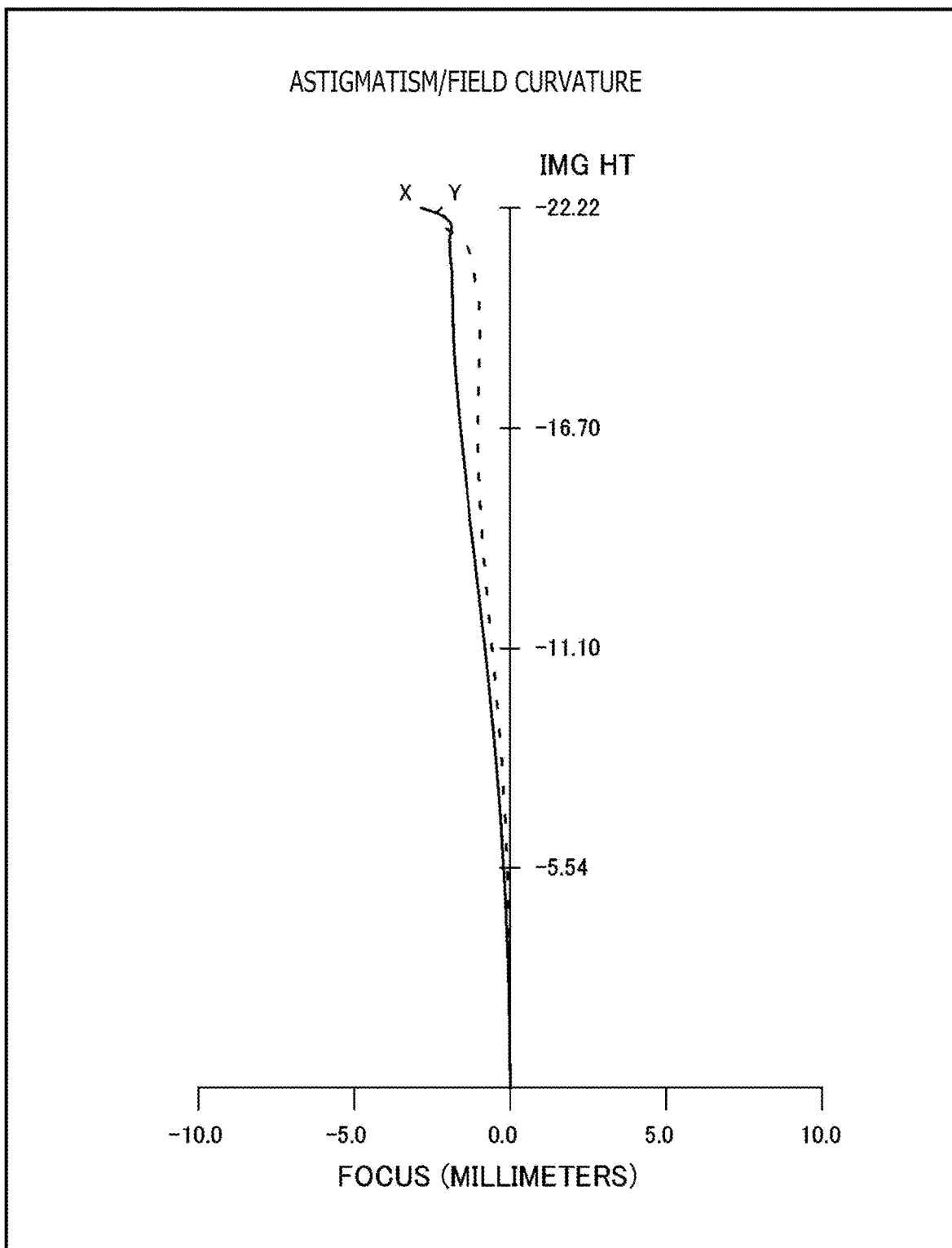
FIG. 10 is an aberration diagram illustrating field curvature and astigmatism of a lens unit having a lens configuration according to the second example illustrated in FIG. 3 and having lens data according to a third numerical value example.

[Table 3-1] to [Table 3-3] indicate lens data (third numerical value example) of the lens unit 1B illustrated in FIG. 3. FIG. 10 is an aberration diagram illustrating field curvature and astigmatism of the lens unit according to the third numerical value example.

Figure 11:
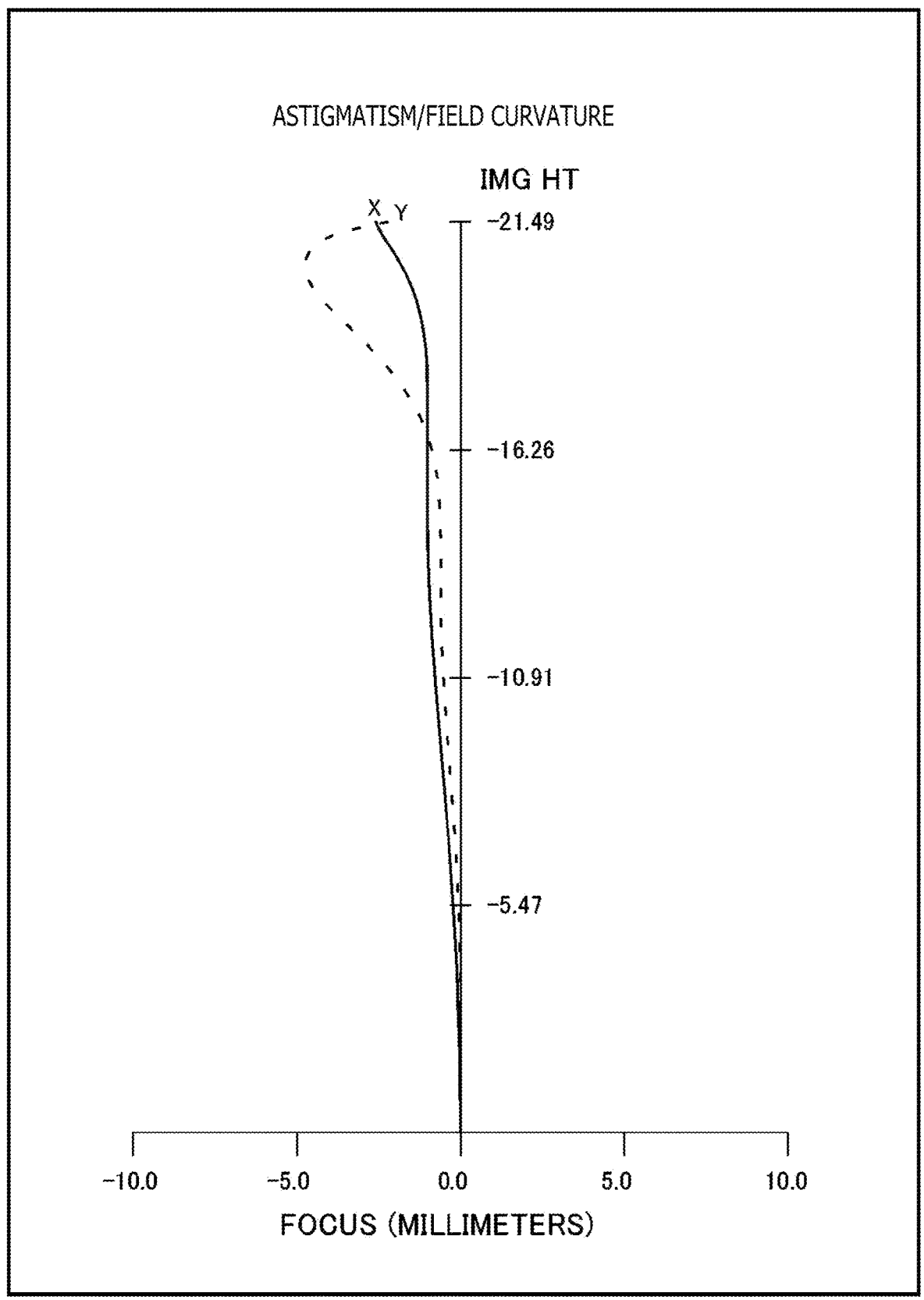
FIG. 11 is an aberration diagram illustrating field curvature and astigmatism of a lens unit having a lens configuration according to the third example illustrated in FIG. 4 and having lens data according to a fourth numerical value example.

[Table 4-1] to [Table 4-3] indicate lens data (fourth numerical value example) of the lens unit 1C illustrated in FIG. 4. FIG. 11 is an aberration diagram illustrating field curvature and astigmatism of the lens unit according to the fourth numerical value example.

Figure 12:
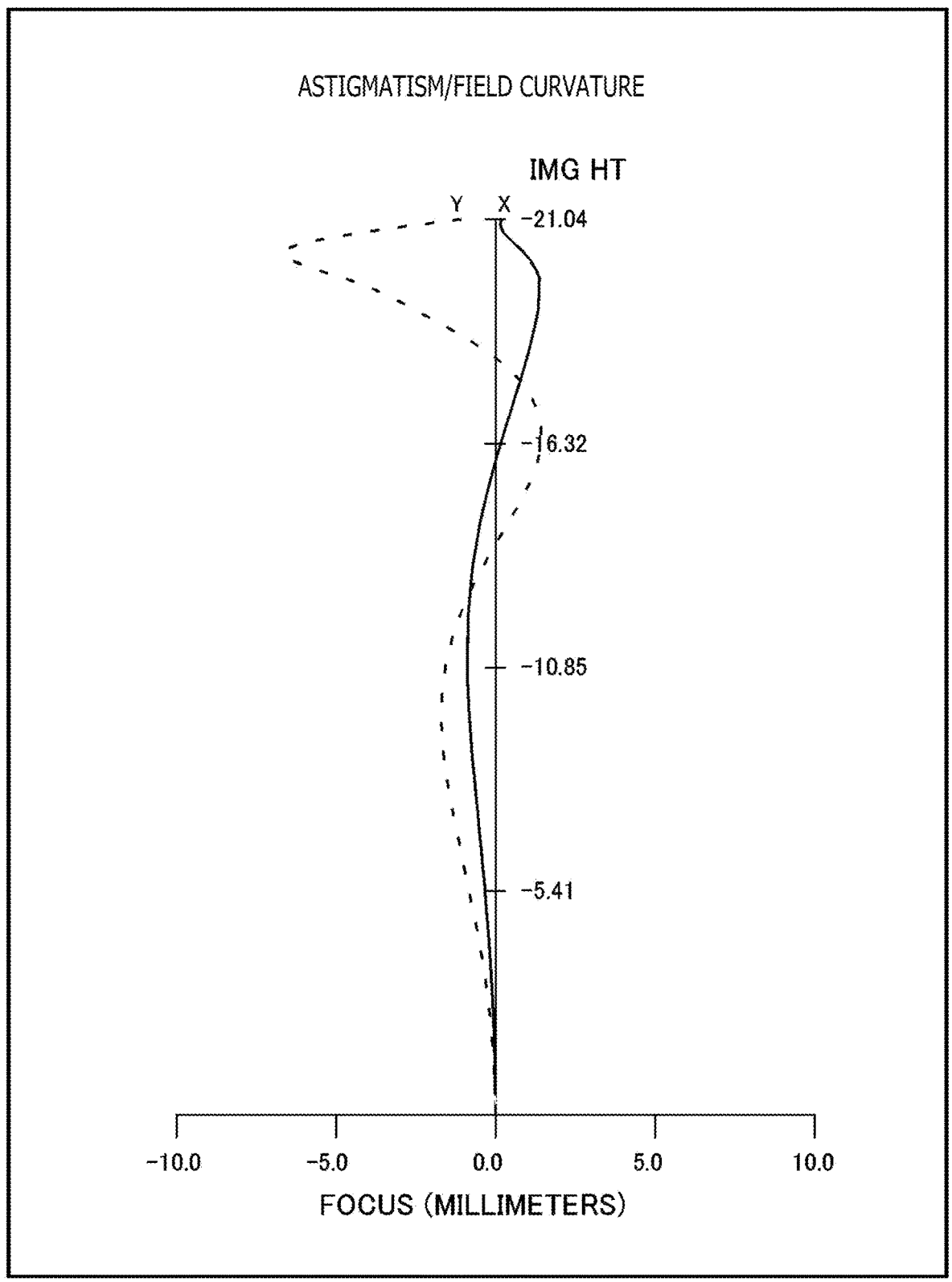
FIG. 12 is an aberration diagram illustrating field curvature and astigmatism of a lens unit having a lens configuration according to the fourth example illustrated in FIG. 5 and having lens data according to a fifth numerical value example.

[Table 5-1] to [Table 5-3] indicate lens data (fifth numerical value example) of the lens unit 1D illustrated in FIG. 5. FIG. 12 is an aberration diagram illustrating field curvature and astigmatism of the lens unit according to the fifth numerical value example.

Figure 13:
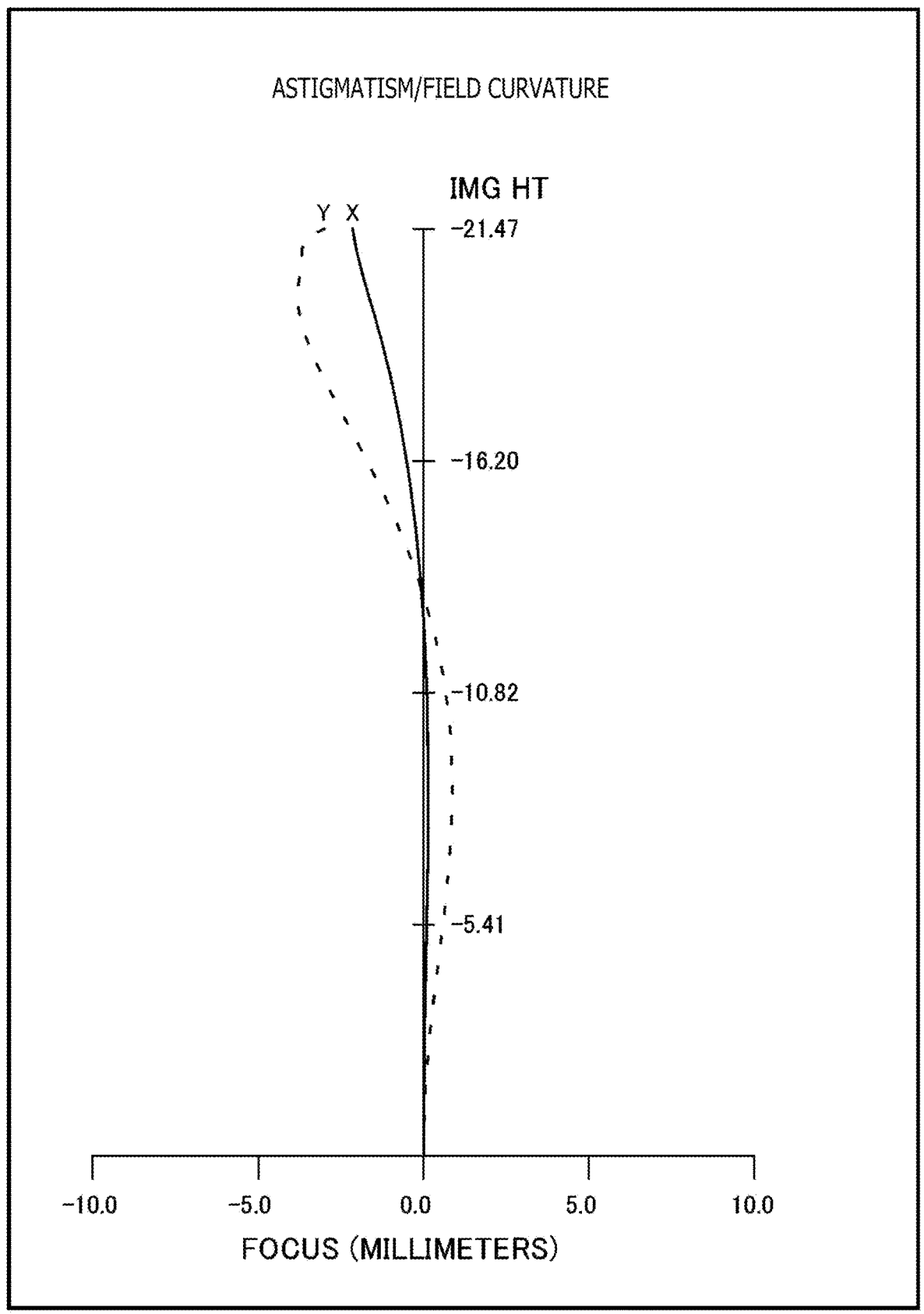
FIG. 13 is an aberration diagram illustrating field curvature and astigmatism of a lens unit having a lens configuration according to the fifth example illustrated in FIG. 6 and having lens data according to a sixth numerical value example.

[Table 6-1] to [Table 6-3] indicate lens data (sixth numerical value example) of the lens unit 1E illustrated in FIG. 6. FIG. 13 is an aberration diagram illustrating field curvature and astigmatism of the lens unit according to the sixth numerical value example.

In the first table ([Table 1-1], [Table 2-1], or the like) among the three tables corresponding to each numerical value example, "i" indicates the number of a surface counted from the display surface ID. A lens surface as an aspheric surface is provided with * to the right of a surface number thereof. A lens surface having a Fresnel structure is provided with * (Fre) to the right of a surface number thereof. "r" indicates the radius of curvature (mm) of a surface. As for the lens surfaces L1b and L2a having a Fresnel structure, the radii of curvature of the lens surfaces Lm and Ln illustrated in FIG. 2(a), the lens surfaces L1b and L2a being based on the lens surfaces Lm and Ln, are indicated as the radii of curvature of the lens surfaces L1b and L2a. A surface whose radius of curvature is "∞" represents a flat surface. "d" in the tables denotes an interval (mm) on the optical axis between an ith surface and an (i+1)th surface (that is, a lens thickness or an air interval). "nd" in the tables denotes the value of the index of refraction of a material (medium) of an optical element having the ith surface at the d-line (wavelength of 587.6 nm). "vd" in the tables denotes the value of the Abbe number of the material of the optical element having the ith surface at the d-line.

The second table ([Table 1-2], [Table 2-2], or the like) among the three tables corresponding to each numerical value example indicates a function expressing a lens surface having an aspheric shape. As for the lens surfaces L1b and L2a having a Fresnel structure, these tables indicate the shapes of the aspheric lenses Lm and Ln on which the lens surfaces L1b and L2a are based. A function defining an aspheric shape is as follows:

$$Z=(h^2/r)/[1+\{1-(1+K)(h^2/r^2)\}^{1/2}]+\Sigma A_i \cdot h^i$$

where
 Z: depth (mm) of the aspheric surface
 h: height (mm) from the optical axis
 r: radius of curvature (mm)
 K: conic coefficient A
 i: ith-order (i is an integer of 3 or more) aspheric coefficient Incidentally, in the tables indicating aspheric coefficients to be described later, E±N (N is an integer) represents×$10^{\pm N}$. "0.12345E−05," for example, represents "0.12345×$10^{-5}$."

The third table ([Table 1-3], [Table 2-3], or the like) among the three tables corresponding to each numerical value example indicates the effective diameters (mm) of the lenses L1 and L2 having a Fresnel structure, the maxima of the absolute values of the tangent angles θ1 and θ2 (see FIG. 2) of the lens surfaces L1b and L2a in the ranges of the effective diameters, the composite focal length F (mm) of the lens unit, the image circle Φ (mm), and values (0.6×Φ−4.0 and 0.6×Φ+8.0) derived from a conditional expression of the image circle φ and the composite focal length F. In addition, [Table 3-3] corresponding to the third numerical value example indicates the central thickness T1 of the third lens L3, the thickness T2 in the intermediate region R4, the thickness T3 in the outside region R2, and the composite focal length Fa of the first lens L1 and the second lens L2 in addition to the maxima of the absolute values of the tangent angles θ1 and θ2 and the like. [Table 4-3], [Table 5-3], and [Table 6-3] corresponding to the fourth to sixth numerical value examples, respectively, indicate the central thickness T1 of the first lens L3, the thickness T2 in the intermediate region R4, and the thickness T3 in the outside region R2 in addition to the maxima of the absolute values of the tangent angles θ1 and θ2 and the like.

In the aberration diagrams of FIGS. 8 to 13, a solid line X represents aberration in a sagittal direction, and a broken line Y represents aberration in a meridional direction.

First Numerical Value Example

TABLE 1-1

| i (SURFACE NUMBER) | r (RADIUS OF CURVATURE) | d (INTERVAL) | nd (INDEX OF REFRACTION) | νd (ABBE NUMBER) | EFFECTIVE DIAMETER |
|---|---|---|---|---|---|
| DISPLAY SURFACE | ∞ | 26.71265858 | | | |
| 1 | ∞ | 1.0 | 1.66 | 20.4 | 26 |
| 2* | −3.7570528E+011 | 0.2 | | | 26 |
| 3* | 2.8774405E+011 | 1.0 | 1.53 | 56.5 | 26 |
| 4 | ∞ | 7.5 | | | 26.5 |
| OBSERVATION SURFACE | ∞ | | | | |

TABLE 1-2

| | SURFACE NUMBER | |
|---|---|---|
| | 2*(Fre) | 3*(Fre) |
| CONIC CONSTANT (K) | 0.0000000E+00 | 0.0000000E+00 |
| 4TH-ORDER ASPHERIC COEFFICIENT (A4) | 1.4381732E−05 | 7.5898581E−06 |
| 6TH-ORDER ASPHERIC COEFFICIENT (A6) | −1.8764013E−08 | 2.3725001E−08 |
| 8TH-ORDER ASPHERIC COEFFICIENT (A8) | 3.7777811E−12 | −7.7081432E−11 |
| 10TH-ORDER ASPHERIC COEFFICIENT (A10) | 4.6967981E−16 | 4.7024088E−15 |
| 12TH-ORDER ASPHERIC COEFFICIENT (A12) | −5.1784405E−19 | 1.2930886E−17 |
| 14TH-ORDER ASPHERIC COEFFICIENT (A14) | 6.15E−22 | 1.16791E−20 |
| 16TH-ORDER ASPHERIC COEFFICIENT (A16) | 4.7727197E−24 | −1.3632619E−23 |
| 18TH-ORDER ASPHERIC COEFFICIENT (A18) | −1.4190983E−28 | −3.0013033E−29 |
| 20TH-ORDER ASPHERIC COEFFICIENT (A20) | | |

TABLE 1-3

| | |
|---|---|
| MAXIMUM OF TANGENT ANGLE θ1 | 42 |
| MAXIMUM OF TANGENT ANGLE θ2 | 43 |
| IMAGE CIRCLE Φ (mm) | 44 |
| 0.6 × Φ − 4.0 | 22.4 |
| 0.6 × Φ + 8.0 | 34.4 |
| COMPOSITE FOCAL LENGTH F (mm) OF FIRST AND SECOND LENSES | 24.3 |
| VIEWING ANGLE | 122.4 |

Second Numerical Value Example

TABLE 2-1

| i (SURFACE NUMBER) | r (RADIUS OF CURVATURE) | d (INTERVAL) | nd (INDEX OF REFRACTION) | νd (ABBE NUMBER) | EFFECTIVE DIAMETER |
|---|---|---|---|---|---|
| DISPLAY SURFACE | ∞ | 24.10309807 | | | |
| 1 | ∞ | 1.0 | 1.53 | 56.5 | 22 |
| 2*(Fre) | −3.2436284E+01 | 0.2 | | | 22 |
| 3*(Fre) | 2.2704518E+01 | 1.0 | 1.53 | 56.5 | 22 |
| 4 | ∞ | 7.5 | | | 22 |
| OBSERVATION SURFACE | ∞ | | | | |

TABLE 2-2

| | SURFACE NUMBER | |
|---|---|---|
| | 2*(Fre) | 3*(Fre) |
| CONIC CONSTANT (K) | 0.0000000E+00 | 0.0000000E+00 |
| 4TH-ORDER ASPHERIC COEFFICIENT (A4) | 1.0976025E−04 | 5.5102482E−05 |
| 6TH-ORDER ASPHERIC COEFFICIENT (A6) | −6.0065979E−07 | 9.1353303E−09 |
| 8TH-ORDER ASPHERIC COEFFICIENT (A8) | 1.4976423E−09 | −1.9155912E−09 |
| 10TH-ORDER ASPHERIC COEFFICIENT (A10) | −1.7569198E−12 | 5.9641055E−12 |
| 12TH-ORDER ASPHERIC COEFFICIENT (A12) | 7.8946330E−16 | −53029928E−15 |
| 14TH-ORDER ASPHERIC COEFFICIENT (A14) | 9.0730563E−21 | 2.9979399E−22 |
| 16TH-ORDER ASPHERIC COEFFICIENT (A16) | −1.6679114E−23 | 4.0833270E−22 |
| 18TH-ORDER ASPHERIC COEFFICIENT (A18) | | |
| 20TH-ORDER ASPHERIC COEFFICIENT (A20) | | |

TABLE 2-3

| | |
|---|---|
| MAXIMUM OF TANGENT ANGLE θ1 | 31 |
| MAXIMUM OF TANGENT ANGLE θ2 | 50 |
| IMAGE CIRCLE Φ (mm) | 48 |
| 0.6 × Φ − 4.0 | 24.8 |
| 0.6 × Φ + 8.0 | 36.8 |
| COMPOSITE FOCAL LENGTH F (mm) OF FIRST AND SECOND LENSES | 25.5 |
| VIEWING ANGLE | 107.2 |

Third Numerical Value Example

TABLE 3-1

| i (SURFACE NUMBER) | r (RADIUS OF CURVATURE) | d (INTERVAL) | nd (INDEX OF REFRACTION) | ν d (ABBE NUMBER) | EFFECTIVE DIAMETER |
|---|---|---|---|---|---|
| DISPLAY SURFACE | ∞ | 26.91435149 | | | |
| 1* | 152.1953551 | 2.0 | 1.66 | 20.4 | 30 |
| 2 | ∞ | 0.2 | | | 30 |
| 3 | ∞ | 1.0 | 1.53 | 56.5 | 30 |
| 4*(Fre) | −3.7058215E+01 | 0.2 | | | 30 |
| 5*(Fre) | 3.3866792E−01 | 1.0 | 1.53 | 56.5 | 30 |
| 6 | ∞ | 15 | | | 30 |
| OBSERVATION SURFACE | ∞ | | | | |

TABLE 3-2

| | SURFACE NUMBER | | |
|---|---|---|---|
| | 1* | 4*(Fre) | 5*(Fre) |
| CONIC CONSTANT (K) | 0.0000000E+00 | 0.0000000E+00 | 0.0000000E+00 |
| 4TH-ORDER ASPHERIC COEFFICIENT (A4) | −3.5360660E−05 | −1.4541071E−05 | 2.1602880E−05 |
| 6TH-ORDER ASPHERIC COEFFICIENT (A6) | 5.9316275E−08 | 2.4377362E−08 | −3.1316978E−08 |
| 8TH-ORDER ASPHERIC COEFFICIENT (A8) | −3.0365201E−11 | −1.3854180E−11 | −7.1373843E−12 |
| 10TH-ORDER ASPHERIC COEFFICIENT (A10) | −9.2297901E−15 | −1.9225707E−15 | 1.8282099E−14 |
| 12TH-ORDER ASPHERIC COEFFICIENT (A12) | 1.0412801E−17 | 4.10.16920E−18 | −7.0498079E−19 |
| 14TH-ORDER ASPHERIC COEFFICIENT (A14) | 8.7165722E−22 | 8.1479738E−22 | 1.1212562E−22 |
| 16TH-ORDER ASPHERIC COEFFICIENT (A16) | −4.8274324E−25 | 4.3051800E−25 | −4.4956849E−24 |
| 18TH-ORDER ASPHERIC COEFFICIENT (A18) | 3.1630751E−30 | 4.4049169E−30 | −1.6873906E−80 |
| 20TH-ORDER ASPHERIC COEFFICIENT (A20) | | | |

TABLE 3-3

| MAXIMUM OF TANGENT ANGLE θ 1 | 46 |
|---|---|
| MAXIMUM OF TANGENT ANGLE θ 2 | 41 |
| THICKNESS T1 OF THIRD LENS | 2.0 |
| THICKNESS T2 OF THIRD LENS | 1.917 |
| THICKNESS T3 OF THIRD LENS | 4.259 |
| IMAGE CIRCLE Φ (mm) | 44.8 |
| 0.6 × Φ − 4. 0 | 22.9 |
| 0.6 × Φ + 8. 0 | 34.9 |
| COMPOSITE FOCAL LENGTH F (mm) OF FIRST, SECOND. AND THIRD LENSES | 29.47 |
| COMPOSITE FOCAL LENGTH F (mm) OF FIRST AND SECOND LENSES | 33.54 |
| VIEWING ANGLE | 107.6 |

Fourth Numerical Value Example

TABLE 4-1

| i (SURFACE NUMBER) | r (RADIUS OF CURVATURE) | d (INTERVAL) | nd (INDEX OF REFRACTION) | ν d (ABBE NUMBER) | EFFECTIVE DIAMETER |
|---|---|---|---|---|---|
| DISPLAY SURFACE | ∞ | 29.17413249 | | | |
| 1* | 3.2105570E+01 | 2.0 | 1.66 | 20.4 | 25 |
| 2*(Fre) | 3.2179200E+01 | 0.8 | | | 25 |
| 3*(Fre) | 3.3361109E+01 | 3.0 | 1.53 | 56.5 | 25 |
| 4* | −3.2789388E+01 | 15 | | | 24 |
| OBSERVATION SURFACE | ∞ | | | | |

TABLE 4-2

| | SURFACE NUMBER | | | |
|---|---|---|---|---|
| | 1* | 2*(Fre) | 3*(Fre) | 4* |
| CONIC CONSTANT (K) | 0.0000000E+00 | 0.0000000E+00 | 0.0000000E+00 | 0.0000000E+00 |
| 4TH-ORDER ASPHERIC COEFFICIENT (A4) | −9.4856114E−05 | −1.2209875E−04 | 2.0604907E−05 | 7.3324573E−05 |
| 6TH-ORDER ASPHERIC COEFFICIENT (A6) | 1.8053880E−07 | 1.4911719E−07 | −5.8538411E−08 | −8.8462510E−08 |
| 8TH-ORDER ASPHERIC COEFFICIENT (A8) | −3.4277293E−10 | −1.3939732E−11 | 1.7330853E−10 | −2.6981689E−11 |
| 10TH-ORDER ASPHERIC COEFFICIENT (A10) | 5.3404053E−13 | −1.2962106E−13 | −34652060E−13 | 1.0416555E−13 |
| 12TH-ORDER ASPHERIC COEFFICIENT (A12) | −3.6999226E−16 | 5.2156208E−17 | 2.0708000E−16 | −3.6044509E−17 |
| 14TH-ORDER ASPHERIC COEFFICIENT (A14) | 6.6023454E−20 | 7.5892054E−20 | 4.5527169E−20 | |
| 16TH-ORDER ASPHERIC COEFFICIENT (A16) | | 7.4702060E−24 | −8.3540418E−24 | |
| 18TH-ORDER ASPHERIC COEFFICIENT (A18) | | | | |
| 20TH-ORDER ASPHERIC COEFFICIENT (A20) | | | | |

TABLE 4-3

| | |
|---|---|
| MAXIMUM OF TANGENT ANGLE θ 1 | 44 |
| MAXIMUM OF TANGENT ANGLE θ 2 | 40 |
| THICKNESS T1 OF FIRST LENS | 2.0 |
| THICKNESS T2 OF FIRST LENS | 1.146 |
| THICKNESS T3 OF FIRST LENS | 4.203 |
| IMAGE CIRCLE Φ (mm) | 47.0 |
| 0.6 × Φ − 4.0 | 24.2 |
| 0.6 × Φ + 8.0 | 36.2 |
| COMPOSITE FOCAL LENGTH F (mm) OF FIRST AND SECOND LENSES | 32.8 |
| VIEWING ANGLE | 93.2 |

Fifth Numerical Value Example

TABLE 5-1

| i (SURFACE NUMBER) | r (RADIUS OF CURVATURE) | d (INTERVAL) | nd (INDEX OF REFRACTION) | ν d (ABBE NUMBER) | EFFECTIVE DIAMETER |
|---|---|---|---|---|---|
| DISPLAY SURFACE | ∞ | 25.8057095 | | | |
| 1* | 1.0362675E+02 | 3.5 | 1.66 | 20.4 | 30 |
| 2*(Fre) | −3.4814353E+01 | 1.0 | | | 30 |
| 3*(Fre) | 3.4022720E+01 | 2.65 | 1.53 | 56.5 | 30 |
| 4* | 9.8093296E+01 | 15 | | | 30 |
| OBSERVATION SURFACE | ∞ | | | | |

TABLE 5-2

| | SURFACE NUMBER | | | |
|---|---|---|---|---|
| | 1* | 2*(Fre) | 3*(Fre) | 4* |
| CONIC CONSTANT (K) | 0.0000000E+00 | 0.0000000E+00 | 0.0000000E−00 | 0.0000000E−00 |
| 4TH-ORDER ASPHERIC COEFFICIENT (A4) | −1.7185371E−05 | 9.0586475E−06 | 4.1482527E−05 | 1.6400174E−05 |
| 6TH-ORDER ASPHERIC COEFFICIENT (A6) | −2.6577771E−08 | −3.2629091E−08 | −2.7800779E−08 | −3.3805082E−08 |
| 8TH-ORDER ASPHERIC COEFFICIENT (A8) | 3.1902505E−10 | 3.4312275E−11 | −1.2902688E−10 | −4.6165806E−11 |
| 10TH-ORDER ASPHERIC COEFFICIENT (A10) | −1.2646623E−12 | −8.5310724E−15 | 1.6967671E−13 | 1.1527461E−13 |
| 12TH-ORDER ASPHERIC COEFFICIENT (A12) | 2.7708539E−15 | 6.3868153E−18 | −4.1930129E−17 | −5.5986513E−17 |
| 14TH-ORDER ASPHERIC COEFFICIENT (A14) | −3.4179549E−18 | −3.9179995E−21 | −1.1670504E−21 | |
| 16TH-ORDER ASPHERIC COEFFICIENT (A16) | 2.2215292E−21 | −2.4198552E−25 | −1.3067069E−23 | |
| 18TH-ORDER ASPHERIC COEFFICIENT (A18) | −5.9115872E−25 | | | |
| 20TH-ORDER ASPHERIC COEFFICIENT (A20) | | | | |

TABLE 5-3

| | |
|---|---|
| MAXIMUM OF TANGENT ANGLE θ 1 | 43 |
| MAXIMUM OF TANGENT ANGLE θ 2 | 44 |
| THICKNESS T1 OF FIRST LENS | 3.5 |
| THICKNESS T2 OF FIRST LENS | 3.158 |
| THICKNESS T3 OF FIRST LENS | 4.971 |
| MAGE CIRCLE Φ (mm) | 44.5 |
| 0.6 × Φ − 4.0 | 22.7 |
| 0.6 × Φ + 8.0 | 34.7 |
| COMPOSITE FOCAL LENGTH F (mm) OF FIRST AND SECOND LENSES | 28.4 |
| VIEWING ANGLE | 108.0 |

Sixth Numerical Value Example

TABLE 6-1

| i (SURFACE NUMBER) | r (RADIUS OF CURVATURE) | d (INTERVAL) | nd (INDEX OF REFRACTION) | ν d (ABBE NUMBER) | EFFECTIVE DIAMETER |
|---|---|---|---|---|---|
| DISPLAY SURFACE | ∞ | 28.21653485 | | | |
| 1* | 6.0973853E+01 | 2.0 | 1.66 | 20.4 | 26 |
| 2*(Fre) | −1.3255163E+02 | 0.8 | | | 26 |
| 3*(Fre) | 2.9389566E+01 | 1.0 | 1.53 | 56.5 | 26 |
| 4 | ∞ | 15 | | | 26 |
| OBSERVATION SURFACE | ∞ | | | | |

TABLE 6-2

| | SURFACE NUMBER | | |
|---|---|---|---|
| | 1* | 2*(Fre) | 3*(Fre) |
| CONIC CONSTANT (K) | 0.0000000E+00 | 0.0000000E+00 | 0.0000000E+00 |
| 4TH-ORDER ASPHERIC COEFFICIENT (A4) | −8.3419362E−05 | −5.7783516E−05 | 1.6054555E−05 |
| 6TH-ORDER ASPHERIC COEFFICIENT (A6) | 2.1993361E−07 | 1.0075813E−07 | −9.2139204E−08 |

TABLE 6-2-continued

| | SURFACE NUMBER | | |
|---|---|---|---|
| | 1* | 2*(Fre) | 3*(Fre) |
| 8TH-ORDER ASPHERIC COEFFICIENT (A8) | −3.7169842E−10 | −3.4631477E−11 | 2.3125896E−10 |
| 10TH-ORDER ASPHERIC COEFFICIENT (A10) | 4.8962212E−13 | −1.0013013E−13 | −3.2892134E−13 |
| 12TH-ORDER ASPHERIC COEFFICIENT (A12) | −3.7042637E−16 | 1.1326405E−16 | 1.7028613E−16 |
| 14TH-ORDER ASPHERIC COEFFICIENT (A14) | 1.0675422E−19 | 6.7108664E−21 | 1.7335487E−20 |
| 16TH-ORDER ASPHERIC COEFFICIENT (A16) | −8.912334E−24 | 4.0521751E−24 | −7.6199383E−24 |
| 18TH-ORDER ASPHERIC COEFFICIENT (A18) | 8.9451543E−27 | −3.2902813E−26 | −2.4745152E−26 |
| 20TH-ORDER ASPHERIC COEFFICIENT (A20) | 3.6544872E−30 | −1.9518850E−29 | −9.7204590E−30 |

TABLE 6-3

| MAXIMUM OF TANGENT ANGLE θ 1 | 33 |
|---|---|
| MAXIMUM OF TANGENT ANGLE θ 2 | 39 |
| THICKNESS T1 OF FIRST LENS | 2.0 |
| THICKNESS T2 OF FIRST LENS | 1.763 |
| THICKNESS T3 OF FIRST LENS | 4.015 |
| IMAGE CIRCLE Φ (mm). | 47.0 |
| 0.6 × Φ − 4.0 | 24.2 |
| 0.6 × Φ + 8.0 | 36.2 |
| COMPOSITE FOCAL LENGTH F (mm) OF FIRST AND SECOND LENSES | 30.1 |
| VIEWING ANGLE | 97.4 |

The technology according to the present disclosure is not limited to the embodiments and the examples described above, but are susceptible of various modifications. The shape and numerical values of each part represented in each numerical value example described above are each a mere example for carrying out the present technology, and the technical scope of the present technology is not to be construed restrictively on the basis thereof. In addition, while a lens unit (lens unit 1B) essentially including three lenses and lens units (lens units 1A and 1C to 1E) essentially including two lenses have been described as embodiments and examples described above, the lens units may further include a lens essentially having no refractive power.

The invention claimed is:

1. An ocular optical system for an image observing device, comprising:
a first lens;
a second lens, wherein:
   the first lens and the second lens are arranged side by side with the first lens disposed toward a display surface side of a display element on which an image is displayed;
   the second lens is disposed toward an observation surface side;
   the first lens is a Fresnel lens having a first lens surface having a Fresnel structure facing the second lens, and includes a positive refractive power; and
   the second lens is a Fresnel lens having a second lens surface having a Fresnel structure facing the first lens, and includes a positive refractive power; and
a third lens disposed between the first lens and the display surface side, wherein:
   the first lens, the second lens, and the third lens each include a respective center that define an optical axis passing therethrough; and
   the third lens includes:
      a third lens surface that faces the display surface side, wherein the third lens surface is an aspheric surface;
      a fourth lens surface that faces the first lens and is substantially flat;
      a first distance between a whole area of the fourth lens surface and the first lens is smaller than a first thickness of the first lens and a second thickness of the second lens;
      a second distance between the third lens surface and the display surface is larger than half of a diameter Φ of an image circle of the first lens, second lens, and third lens;
      a peripheral region surrounding, and separated from, the optical axis, that refracts light in a direction away from the optical axis; and
      an intermediate region extending between the center of the third lens and the peripheral region, wherein:
         the peripheral region includes a convex shape extending from the intermediate region to an end of the third lens so as to have a negative refractive power, such that the following conditions are satisfied:
         T1 is a thickness in the center of the third lens, T2 is a minimum thickness of the intermediate region, and T3 is a maximum thickness in the peripheral region:
            T3>T1>T2;
            0.5 mm<T1≤4.0 mm;
            0.5 mm≤T2<4.0 mm;
            2.4 mm≤T3≤6.5 mm; and
         n1 is an index of refraction of the first lens, n2 is an index of refraction of the second lens, and n3 is an index of refraction of the third lens, respectively:
            n1≤1.54;
            n2≤1.54; and
            n3≥1.6.

2. The ocular optical system according to claim 1, wherein the Fresnel structures of the first lens surface and the second lens surface, respectively, include a plurality of concentrically arranged rising surfaces and a plurality of concentrically arranged curved surfaces separating adjacent rising surfaces of the plurality of concentrically arranged rising surfaces, each curved surface defining a respective tangent plane,
when a first given angle formed between a plane orthogonal to the optical axis and a given one of the respective tangent planes of the curved surfaces of the first lens surface is set as a first tangent angle, and when a second given angle formed between the plane orthogonal to the optical axis and a given one of the respective tangent planes of the curved surfaces of the second lens surface is set as a second tangent angle,
a maximum of an absolute value of the first tangent angle of the curved surfaces within a range of an effective diameter of the first lens surface is 30 degrees or more and 55 degrees or less, and a maximum of an absolute value of the second tangent angle of the curved surfaces within a range of an effective diameter of the second lens surface is also 30 degrees or more and 55 degrees or less.

3. The ocular optical system according to claim 1, wherein the Fresnel structures of the first lens surface and the second lens surface, respectively, include a plurality of concentrically arranged curved surfaces that separate adjacent rising surfaces of the plurality of concentrically arranged rising surfaces and each have a pitch that is greater than or equal to 80 μm and less than or equal to 1800 μm.

4. The ocular optical system according to claim 1, wherein the Fresnel structures of the first lens surface and the second lens surface, respectively, include a plurality of concentrically arranged curved surfaces that separate adjacent rising surfaces of the plurality of concentrically arranged rising surfaces; and an amount of sag of each curved surface is greater than or equal to 25 μm and less than or equal to 300 μm.

5. The ocular optical system according to claim 1, wherein a composite focal length of the first lens, the second lens, and the third lens is greater than or equal to 25 mm and less than or equal to 35 mm.

6. The ocular optical system according to claim 1, wherein:

the Fresnel structures of the first lens surface and the second lens surface, respectively, include a plurality of concentrically arranged rising surfaces, and distances of the plurality of concentrically arranged rising surfaces of the first lens surface from the optical axis are different from those of the second lens surface.

7. An image observing device comprising:
a display element; and
a lens unit including:
  a first lens;
  a second lens, wherein:
    the first lens and the second lens are arranged side by side with the first lens disposed toward a display surface side of the display element on which an image is displayed;
    the second lens is disposed toward an observation surface side;
    the first lens is a Fresnel lens having a first lens surface having a Fresnel structure facing the second lens, and includes a positive refractive power; and
    the second lens is a Fresnel lens having a second lens surface having a Fresnel structure facing the first lens, and includes a positive refractive power; and
  a third lens disposed between the first lens and the display surface side, wherein:
    the first lens, the second lens, and the third lens each include a respective center that define an optical axis passing therethrough;
    the third lens includes:
      a third lens surface that faces the display surface side and is an aspheric surface;
      a fourth lens surface that faces the first lens and is substantially flat;
      a first distance between a whole area of the fourth lens surface and the first lens is smaller than a first thickness of the first lens and a second thickness of the second lens,
      a second distance between the third lens surface and the display surface is larger than half of a diameter Φ of an image circle of the lens unit,
      a peripheral region surrounding, and separated from, the optical axis, that refracts light in a direction away from the optical axis; and
      an intermediate region extending between the center of the third lens and the peripheral region, wherein:
        the peripheral region includes a convex shape extending from the intermediate region to an end of the third lens so as to have a negative refractive power, such that the following conditions are satisfied:
        T1 is a thickness in the center of the third lens, T2 is a thickness of the intermediate region, and T3 is a thickness in the peripheral region:
        $T3 > T1 > T2$;
        $0.5 \text{ mm} < T1 \leq 4.0 \text{ mm}$;
        $0.5 \text{ mm} \leq T2 < 4.0 \text{ mm}$;
        $2.4 \text{ mm} \leq T3 \leq 6.5 \text{ mm}$; and
        n1 is an index of refraction of the first lens, n2 is an index of refraction of the second lens, and n3 is an index of refraction of the third lens, respectively:
        $n1 \leq 1.54$;
        $n2 \leq 1.54$; and
        $n3 \geq 1.6$.

* * * * *